Aug. 27, 1929.  J. B. ARMITAGE  1,726,376
METAL WORKING MACHINE
Filed Nov. 2, 1925  9 Sheets-Sheet 1

INVENTOR
Joseph B Armitage
BY
Fred G Parsons
ATTORNEY

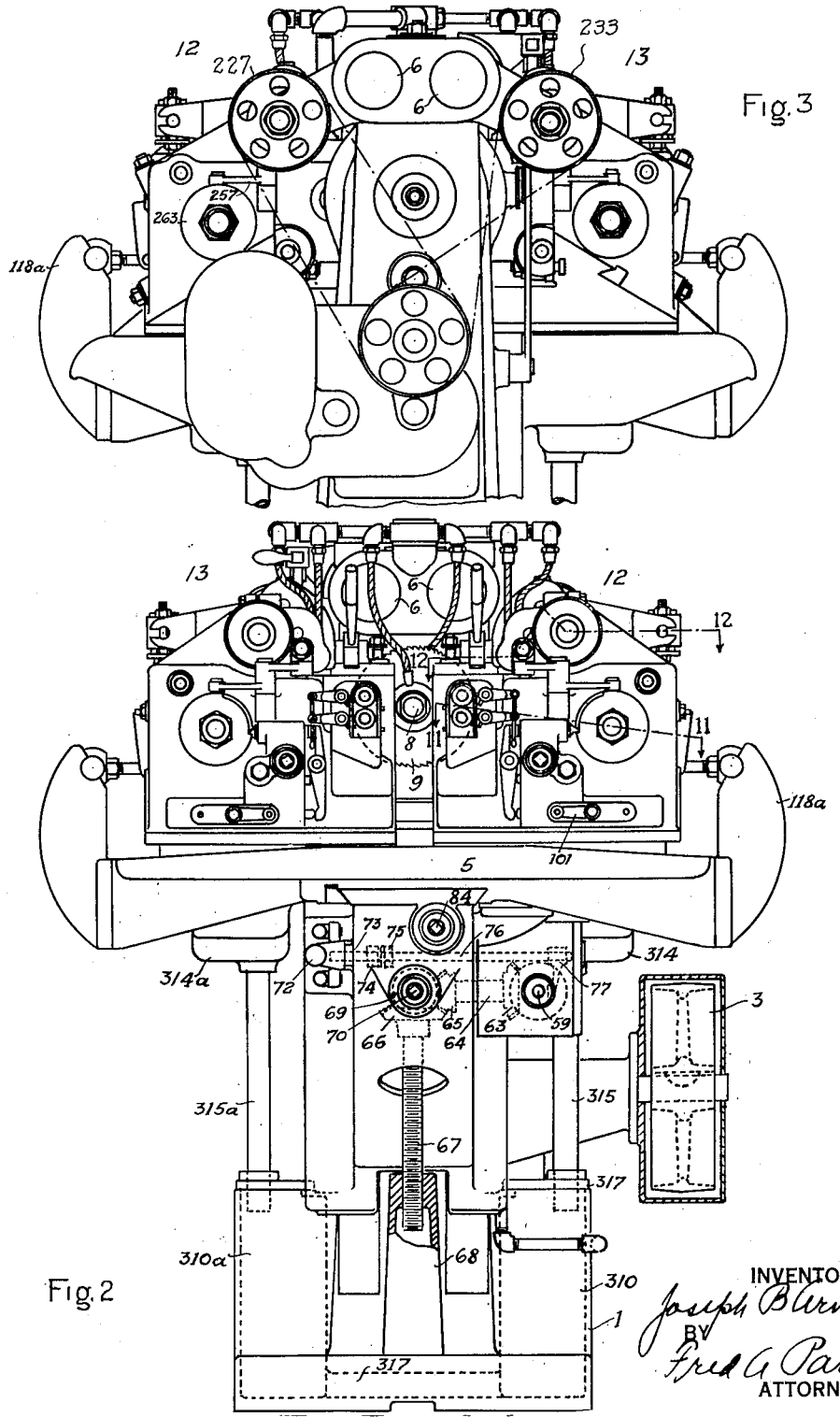

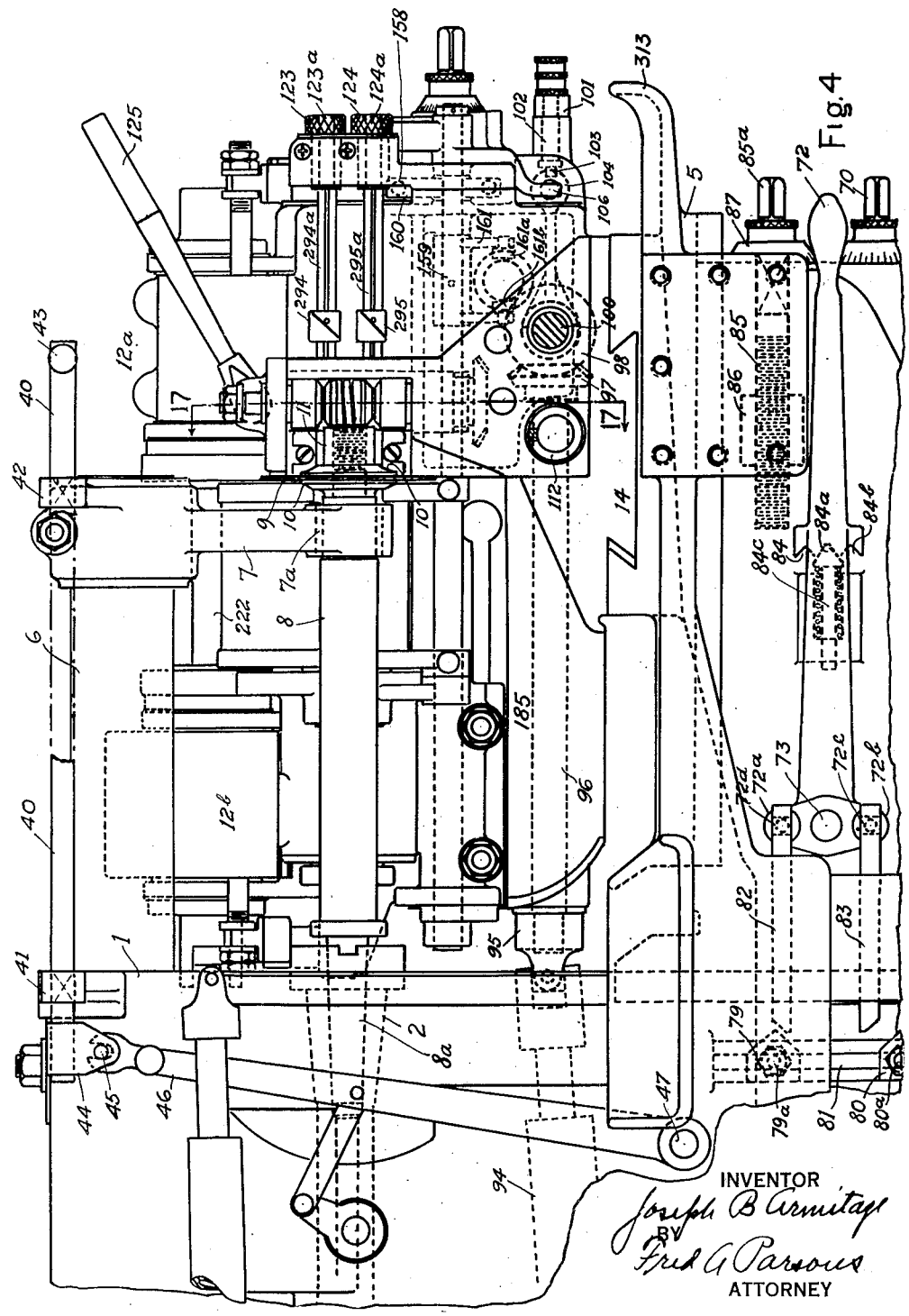

Aug. 27, 1929.                J. B. ARMITAGE                1,726,376
                            METAL WORKING MACHINE
                    Filed Nov. 2, 1925        9 Sheets-Sheet 5

INVENTOR
Joseph B Armitage
BY
Fred G Parsons
ATTORNEY

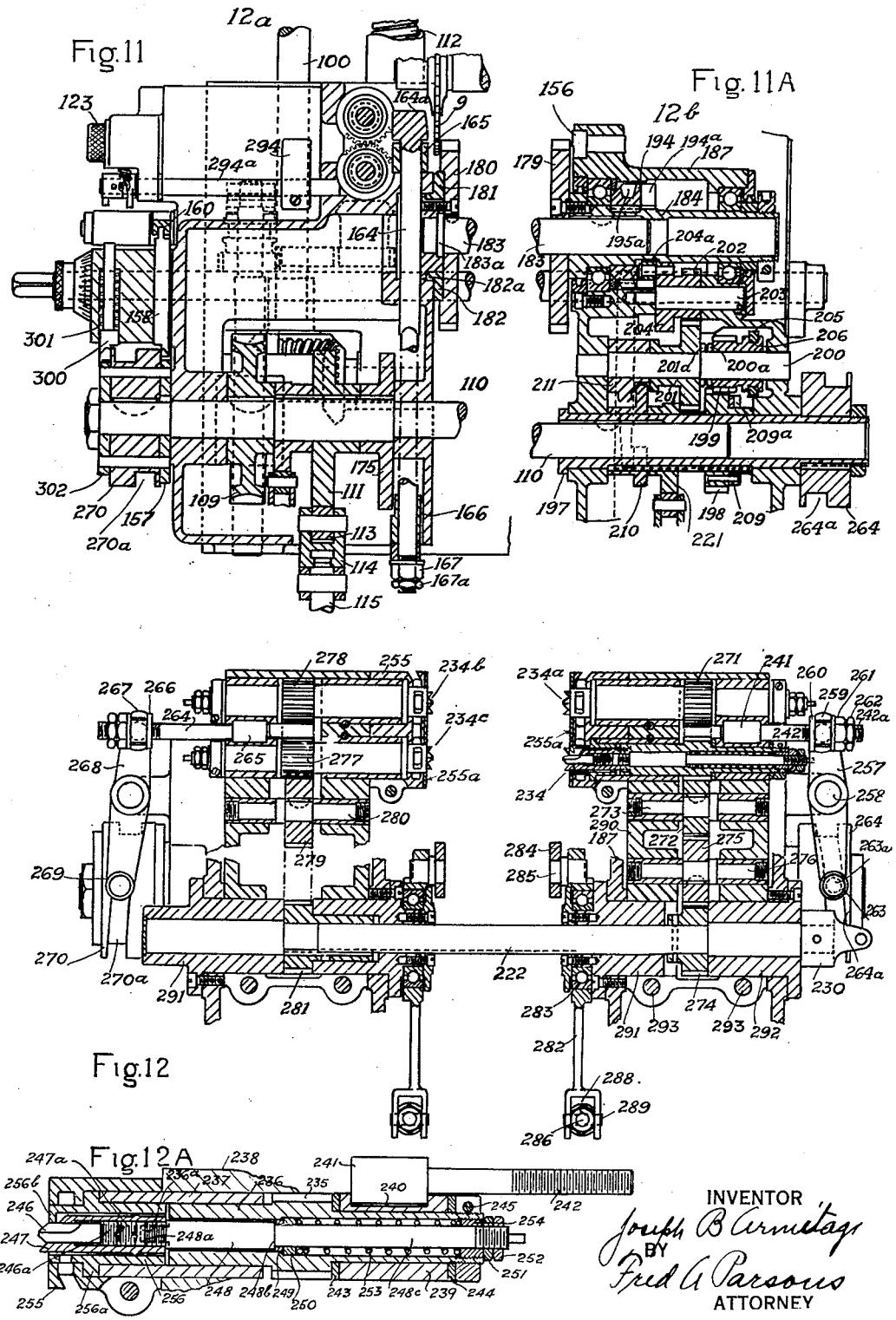

Aug. 27, 1929.  J. B. ARMITAGE  1,726,376
METAL WORKING MACHINE
Filed Nov. 2, 1925   9 Sheets-Sheet 7

INVENTOR
Joseph B Armitage
BY
Fred G Parsons
ATTORNEY

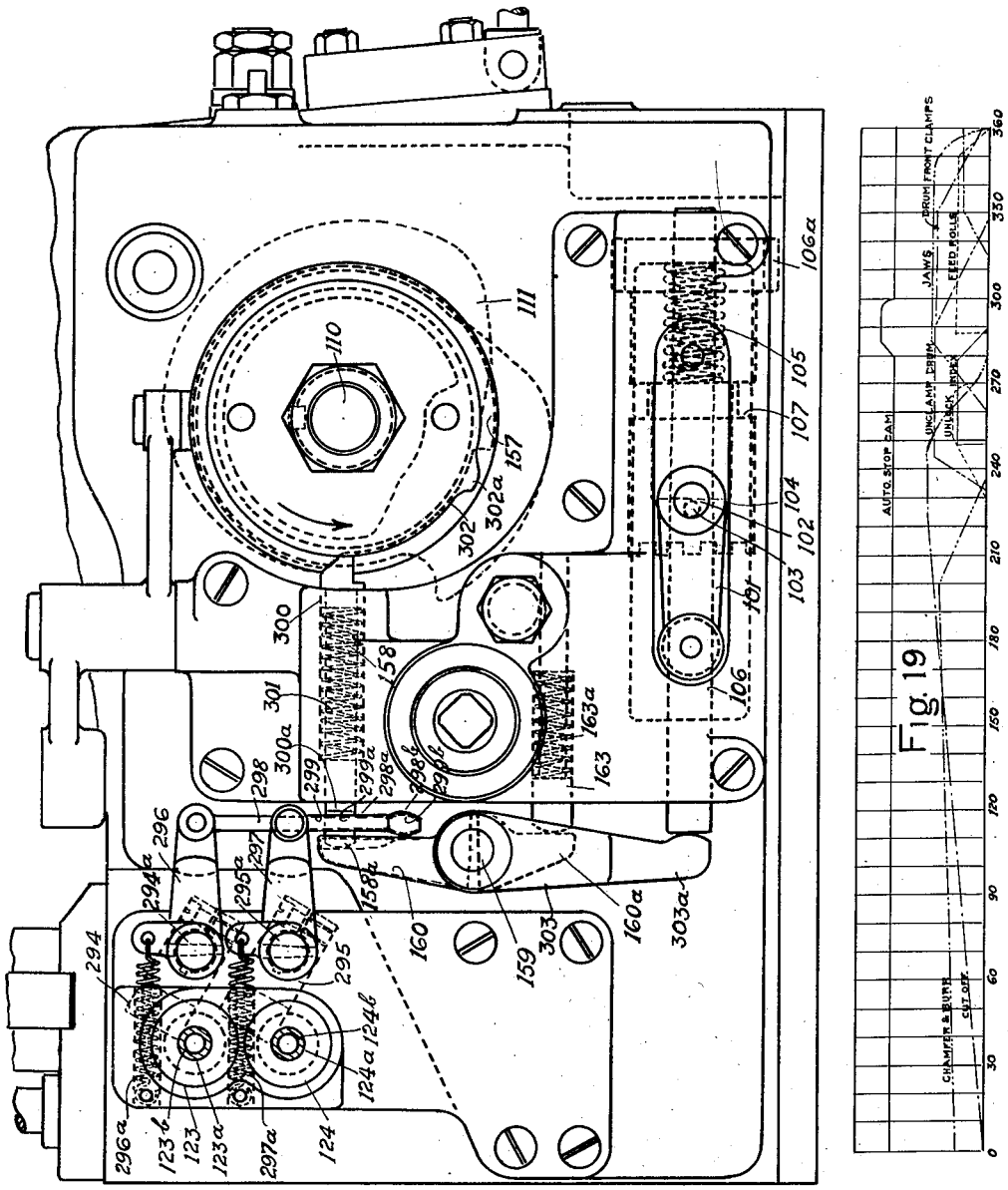

Aug. 27, 1929.  J. B. ARMITAGE  1,726,376
METAL WORKING MACHINE
Filed Nov. 2, 1925  9 Sheets-Sheet 9

INVENTOR
Joseph B Armitage
BY
Fred G Parsons
ATTORNEY

Patented Aug. 27, 1929.

1,726,376

UNITED STATES PATENT OFFICE.

JOSEPH B. ARMITAGE, OF MILWAUKEE, WISCONSIN, ASSIGNOR TO KEARNEY & TRECKER CORPORATION, OF WEST ALLIS, WISCONSIN.

METAL-WORKING MACHINE.

Application filed November 2, 1925. Serial No. 66,361.

This invention relates generally to metal working machines, and more particularly to a machine tool adapted to automatically cut off and subsequently perform other operations upon work pieces of a nature adapted to be formed out of relatively long bars or rods.

A purpose of the invention is to provide a machine suited to cut off work material to required length from a bar of stock of suitable dimensions and thereafter shape or machine an end of the work piece, and to perform such operations successively and practically continuously without operative attention except to supply the bars from which the work pieces are cut off.

A further purpose is to provide a machine which will operate as above described simultaneously upon a plurality of bars by the means of mechanism which is only part duplicated for a second bar, thereby substantially doubling the capacity of the machine without doubling the mechanism required.

A further purpose is to provide a machine which will operate alternately first upon one and then upon another of a plurality of bars, by the means of mechanism not entirely duplicated for the second bar and which is so arranged and timed that a portion of the mechanism which is operative upon both bars is operative upon the one during time intervals which would otherwise be waste time, that is to say when it is not available for operation on the other, as for instance during a return stroke; whereby a very substantial increase in production effect is obtained without a corresponding increase in mechanism.

A further purpose is to provide mechanism which will operate simultaneously upon a first plurality of bars as above described and will operate alternately upon a second plurality of bars as above described whereby the advantages described separately above for simultaneous and for alternate operation are combined into a single mechanism capable of extremely high productive capacity in relation to the mechanism required.

A further purpose is to devise improved mechanism for cutting off and burring the ends of rollers and particularly adapted for rollers formed of flat material rolled or twisted into the form of a helix for the purpose of providing hollow rolls of comparatively great elasticity.

A further purpose is to simplify and improve the construction and operation of a machine tool adapted to accomplish the previously mentioned purposes severally or combinedly.

With these and other purposes in view the invention which it is desired to protect by patent, consist of and resides in the construction as herein shown and described in one of the preferred embodiments thereof, and in such modifications as are within the spirit and scope of the claims herewith, it being apparent that a variety of such modifications are possible without departing from the scope of the invention as particularly pointed out in the claims.

In the accompanying drawings like reference characters are used to indicate the same parts throughout the several views of which:

Fig. 1 is a side elevation, taken from the right of a machine embodying the invention. The operator's position is ordinarily to the left of Fig. 1, facing the machine. To the left of Fig. 1 is therefore considered the front of the machine and to the right and left hand of the operator when positioned as described will be taken to indicate right and left hand portions of the machine in the following description unless otherwise specified.

Fig. 2 is a front elevation of the complete machine.

Fig. 3 is a rear elevation of the upper portion of the machine.

Fig. 4 is an elevation taken from the left of a front upper portion of the machine drawn to larger scale than the preceeding views, and in which the left hand unit has been removed to clearly show the saw and the right hand unit.

Fig. 11 is a horizontal section of the front portion of the right hand unit, along line 11—11 of Fig. 2 enlarged.

Fig. 11^A is a developed section of certain gear trains etc., of the rear portion of the right hand unit.

Fig. 12 is a developed section through the chamfering spindles and their driving trains in the front and rear portion of the right hand unit, the section being taken along line 12—12 of Fig. 2 enlarged.

Fig. 12^A is a still farther enlarged section through one of the chamfering spindles.

Figure 13:
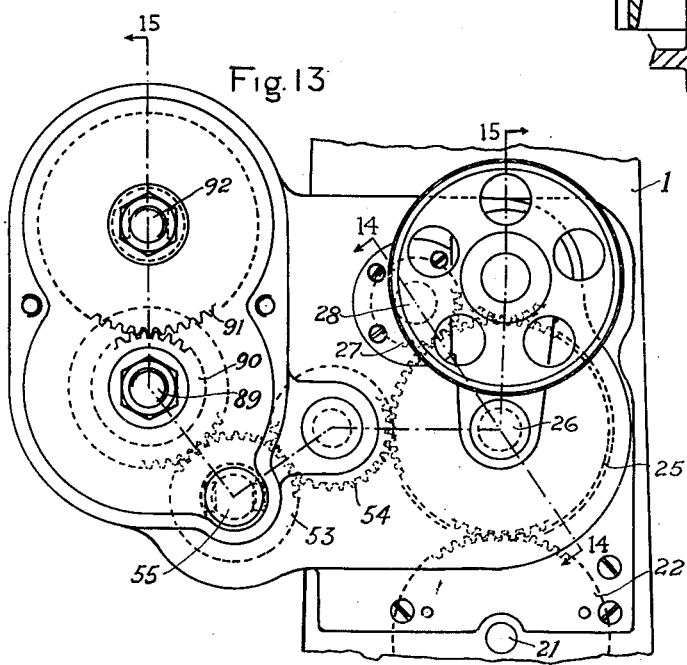

Fig. 13 is a rear view of a portion of the driving mechanism supported from the rear of the column.

Figure 14:
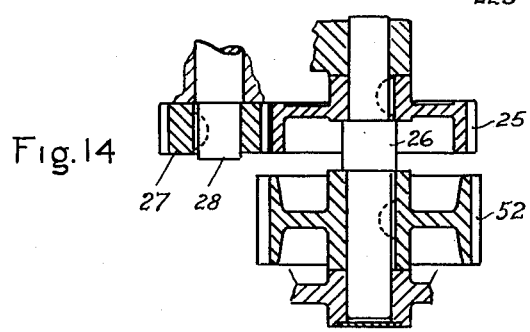

Fig. 14 is a fragmentary section along line 14—14 of Fig. 13.

Figure 15:
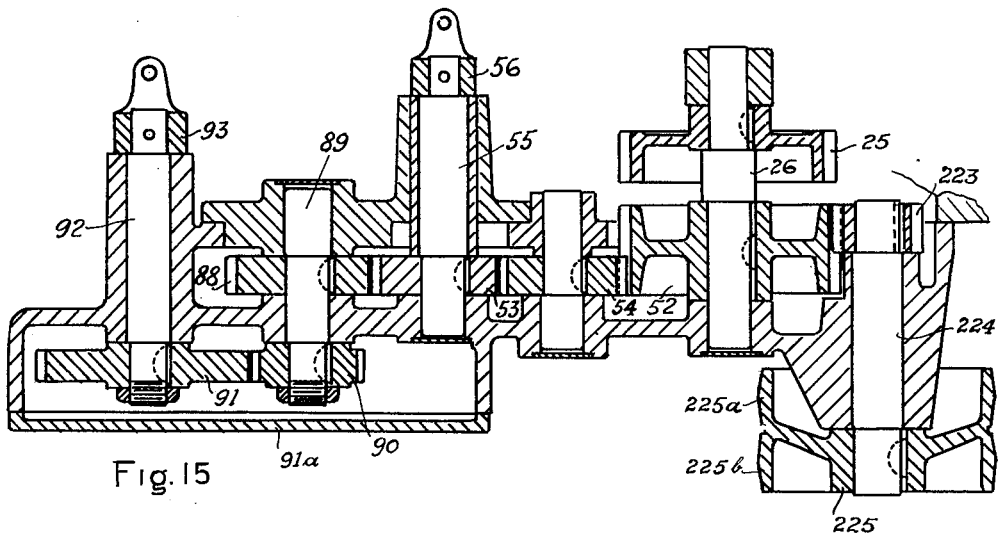

Fig. 15 is a developed section along line 15—15 of Fig. 13.

Fig. 16 is an enlarged front view of the right hand unit shown in Fig. 2.

Figure 17:
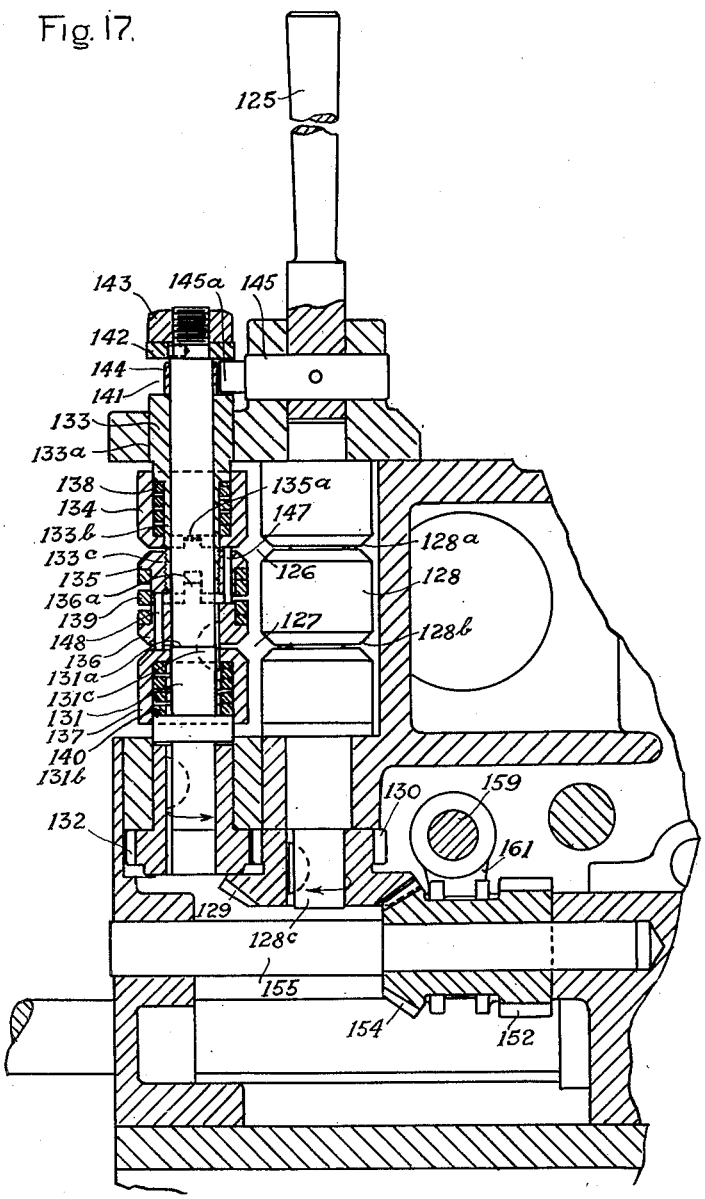

Fig. 17 is an enlarged section through the feed rolls of the right hand unit, and a portion of their driving mechanism, taken along line 17—17 of Fig. 4.

Figure 18:
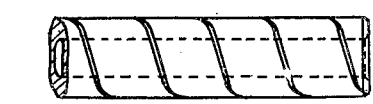

Fig. 18 is a view of a portion of a stock bar showing one of a variety of forms of stock upon which this machine is particularly adapted to operate.

Fig. 19 shows a cam chart in which the relative timing of the various operating movements is diagrammed in relation to the 360 degrees of movement of shaft 110.

The general relationship of the main structural elements will first be described. A main column or support 1 rotatably supports a spindle 2, to be driven from a main drive pulley or power source 3 by mechanism which will be later described. Vertically slidable on suitable ways or guides on column 1 is a support or knee 4, upon which a saddle or support 5 is slidably guided for movement toward and from the face of column 1.

A plurality of overarms 6—6 are adjustably fixed in column 1 and at their front end are provided with a pendant 7 adjustably fixed in engagement with the forwardly projecting ends of each of the overarms 6. A bearing or bushing 7^a in pendant 7 provides a rigid support near the outer or front end of a rotatable tool arbor 8, the rear end 8^a of which is fixed for rotation with and supported from spindle 2. Removably fixed on the front end of arbor 8 is a milling saw 9 retained between removable clamping flanges 10 by the means of a nut 11 threaded on arbor 8.

Slidably supported on the saddle 5 are a plurality of movable units arranged on opposite sides of the periphery of saw 9 and generally denoted in Fig. 2 by the numeral 12 for the unit to the right of the saw, and the numeral 13 for the unit to the left of the saw. The slide construction for units 12 and 13 is more particularly shown at 14 in Fig. 4 in which the view is shown with the left hand unit 13 removed. Each of the units 12 and 13 is bodily slidable on slide 14 toward and from the saw 9 by mechanism which will be later described. The units 12 and 13 are almost exactly similar in their construction and operation except that they are right hand and left hand in the relationship to the saw 9 of the various elements comprising the individual units, and for the sake of avoiding repetition, the details of construction have been fully shown only for the unit 12, it being understood that in the description of the unit 12, where certain parts and their function are described, the corresponding parts exist with similar functions in the unit 13 unless otherwise noted.

The pulley 3 drives spindle 2 and saw 9 by the means of mechanism which will now be described.

Figure 1:
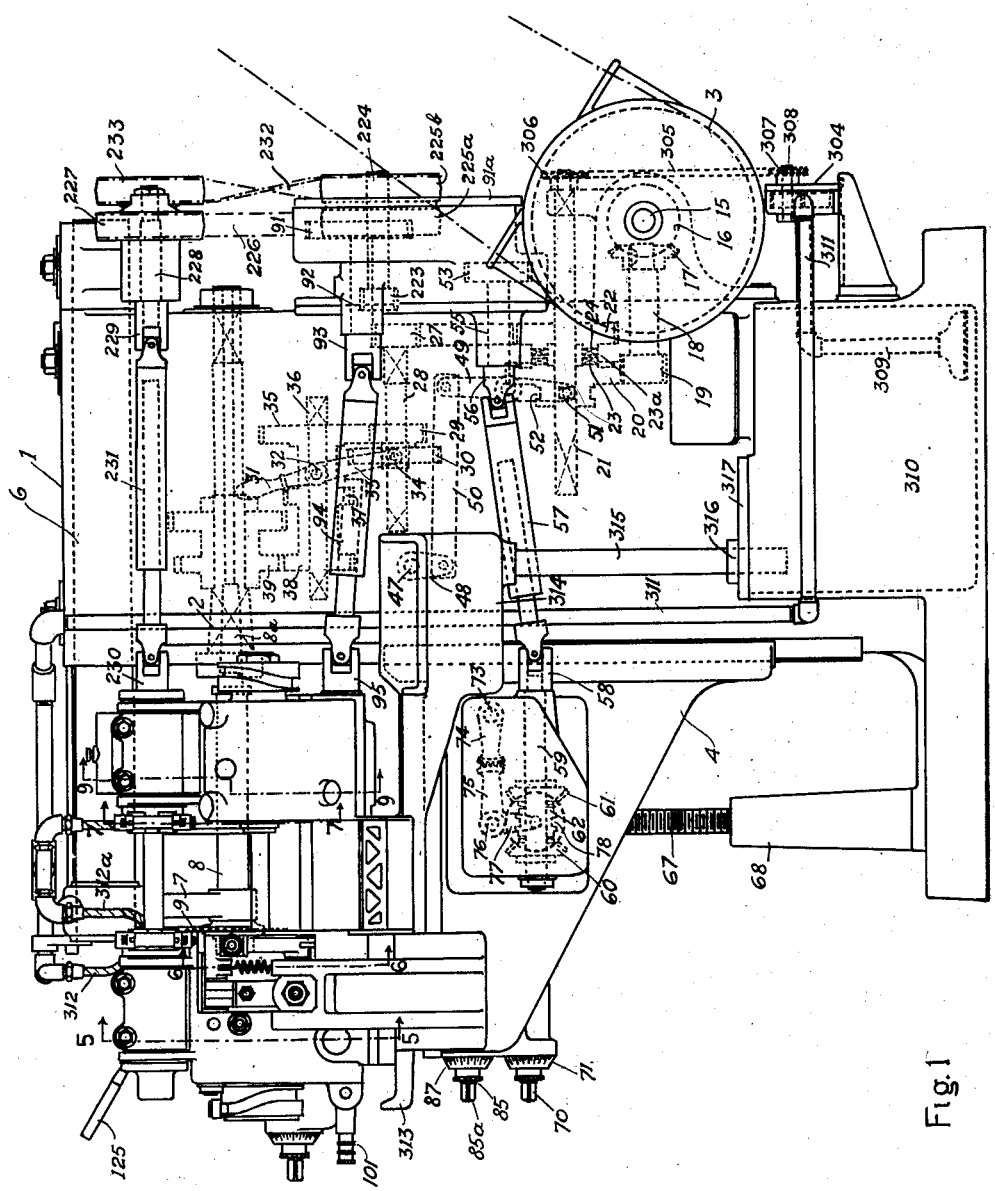

Referring to Fig. 1, pulley 3 is fixed on a shaft 15 rotatably supported from column 1, and fixed upon shaft 15 is a bevel gear 16 meshing with a bevel gear 17 fixed on a shaft 18 rotatably supported from column 1, and having fixed upon the other end a spur gear 19 meshing with a gear 20 slidably supported for rotation upon a rotatable shaft 21. Fixed on shaft 21 is a gear 22. Gears 20 and 22 are provided with complimentary clutch teeth 23 and 24 and although shown in a disengaged position the clutch teeth 23 may engage with clutch teeth 24 when gear 20 is moved along shaft 21 in the proper direction for engagement or the gear may be moved in the other direction to the position shown, for disengagement of the clutch teeth. When the clutch teeth are engaged shaft 21 will be driven from pulley 3. Gear 22 meshes with and drives a gear 25, see Figs. 13–14–15, fixed on shaft 26. Gear 25 meshes with gear 27 fixed on a shaft 28, upon which are slidably splined a unitary pair of gears 29 and 30, which may be moved in either direction on shaft 28, by the means of an exterior hand lever 31 pivoted on a shaft 32, which carries a lever 33 having a pivoted shoe 34, engaging the end faces of gear 30. When in the position shown in Fig. 1 gear 29 engages a gear 35 fixed on a shaft 36, when shifted by the lever 31 to disengage the gear 29 from gear 35, the gear 30 may if movement is continued, engage and drive the gear 37 also fixed on shaft 36. By the above described mechanism power may be transmitted to shaft 36 at either of two different speeds, the gear pairs 29—35 and 30—37 being of different ratio. Gear 38 fixed on shaft 36 meshes with gear 39 on spindle 2, and transmits to the spindle the variable speed thus transmitted to shaft 36 from pulley 3. As previously noted the arbor 8 transmits the spindle rotation to the milling saw 9.

The clutch formed by the clutch teeth 23 and 24 serves to engage or disengage from pulley 3 the entire mechanism of the machine and the means by which gear 20 may be shifted to engage or disengage the clutch will now be described.

A rod or bar 40, see Fig. 4, is slidably supported in brackets 41 and 42 and on the forward end carries a handle 43 in a position to be easily reached by the operator when in his normal position. Fixed on the rear end of rod 40 is a bracket 44 having a pin 45 engaging the slotted end of a lever 46 pivoted on a shaft 47. Shaft 47, see Fig 1, carries a lever 48 which moves a lever 49 by the means of a connecting link or bar 50 pivoted with each lever. The lever 49 is pivoted and at the one end carries a shoe 51 engaging the annular groove 52 in the extended hub of gear 20.

By the above mechanism the operator from his position at the front of the machine may move the gear 20 in either direction to engage or to disengage clutch teeth 23 and 24 and thus start or stop the machine. The clutch teeth 23 and 24 and associated members form a main clutch generally denoted by the numeral 23ª, Fig. 1.

Mechanism is provided for raising and lowering knee 4 whereby the units supported from the knee may be moved from their operative positions relative to the saw or may be dropped to a position permitting free access for removing, replacing or inspecting the saw. This may be done either by power supplied from pulley 3 or by hand, and the power movement may be automatically tripped at predetermined points in the upward or downward travel as follows.

Shaft 26 for which the power movement from pulley 3 has already been described, has fixed upon it a gear 52, see Figs. 13 and 15. Gear 52 drives a gear 53 through an idler 54. Gear 53 is fixed on a short shaft 55 at the front end of which is fixed a member 56 of an extensible universal joint shaft 57, see Fig. 1, which is of well known construction, whereby motion is transmitted from the member 56 to a member 58 movable with knee 4 in any of the positions of adjustment of knee 4. The member 58 is fixed on a shaft 59 upon which are supported a pair of independently rotatable bevel gears 60 and 61. A reverse clutch member 62 is splined slidably on shaft 59 and the clutch member 62 and bevel gears 60 and 61 are each provided with complimentary clutch teeth whereby the clutch member when suitably positioned may engage with and drive either of the bevel gears 60 or 61, or may be centrally positioned out of operative engagement with either gear.

The bevel gears 60 and 61 each mesh with a bevel gear 63, see Fig. 2, fixed on a shaft 64 having a bevel gear 65 also fixed thereon. Bevel gear 65 meshes with a bevel gear 66 fixed on the upper end of vertical screw 67 which is rotatably supported but fixed against axial movement in relation to the knee 4 and in engagement with a threaded bore in the upwardly projecting portion 68 of the base of column 1. A rotation of screw 67 by the means of the mechanism described, from shaft 59 through the one or the other of the bevel gears 60 or 61 accordingly as clutch member 62 is engaged, will result in a raising or lowering of knee 4 and the mechanism supported therefrom. Meshing with bevel gear 66 is a bevel gear 69 fixed on a shaft 70 which projects from the front of the knee 4 and is provided with a squared end for a hand crank, not shown, whereby the knee may be raised or lowered manually. The shaft 70 is provided with a graduated dial 71.

To manually shift the clutch member 62 a hand lever 72 see Figs. 2 and 4, is fixed on a shaft 73 provided with an inner lever 74, see Fig. 1, having gear segment teeth meshing with complimentary teeth on a lever 75 fixed on a shaft 76. The shaft 76 has fixed upon it a lever 77 with arm portion engaging an annular groove 78 in the member 62.

The clutch member 62 may be automatically shifted from either engaged to a disengaged position by dogs 79 and 80 adjustably supported on column 1 by the means of a T slot 81 and T bolts 79ª and 80ª, see Fig. 4. The lever 72 is provided with extensions or arms 72ª and 72ᵇ provided with pivoted shoes 72ᶜ and 72ᵈ, respectively engaging with suitable slots in trip pins or plungers 82 and 83, supported in knee 4. The arrangement of the above described mechanism is such that engagement of clutch member 62 in the one direction will move the one trip pin into a position to be later contacted by one of the dogs 79 or 80 as the knee is moved, while engagement of member 62 in the other direction will move the other trip pin to be later contacted by the other dog, and when the pins are so contacted the clutch member will be forced out of engagement to stop the movement of the knee, and the knee having been thus stopped from movement in the one direction the member 62 may be immediately re-engaged in the opposite direction to give opposite movement to the knee 4. The dogs 79 and 80 may be adjusted in their vertical positions to determine the limit or extent of knee movement and the stopping or trip point of the knee in either direction, although the knee having been tripped from power movement by the dogs may have its movement continued manually by the means of a crank applied to the squared end of the shaft 70. The lever 72 and various associated parts are yieldingly retained in positions corresponding to the three positions of clutch member 62 by the means of notches 84, 84ᵃ, 84ᵇ, in a detent member fixed on the lever 72 and engaged by a spring pressed plunger 84ᶜ supported from knee 4.

The saddle 5 may be adjusted in and out toward column 1 on the slide provided on knee 4 by the means of a screw 85 rotatably journaled but fixed against axial movement in knee 4, and in threaded engagement with a nut 86 fixed with saddle 5, see Fig. 4. A squared end 85ᵃ is provided on screw 85 for applying a hand crank not shown, and a dial 87 is graduated to provide means for gauging or determining the amount of cross adjustment.

Each of the units 12 and 13 is provided with power movement toward and from the saw 9 for cutting off the work pieces. The gear 53, the drive mechanism for which was previously described meshes with a gear 88 fixed on shaft 89, on the rear end of which a gear 90 is removably fixed, see Figs. 1–13–15. A removable gear 91 mounted on shaft 92 meshes with gear 90. The gears 90 and 91 are both removable from their respective shafts and may be bodily interchanged in position upon removal of a cover 91ᵃ. When so interchanged a different speed will be transmitted to shaft 92 since the gears are of different diameter. The gears may also be replaced by other gears of different ratio which are also interchangeable. The construction thus constitutes a speed or rate changer whereby a variety of speeds may be transmitted to the shaft 92 and to the mechanism driven thereby. A member 93 fixed on shaft 92 is the driving member of an extensible universal joint shaft 94 of well known construction whereby motion is transmitted from member 93 to a member 95 movable with unit 12, in any of the positions of adjustment of unit 12. The member 95 is fixed on a shaft 96 journaled in unit 12, see Figs. 4 and 5. At the front end shaft 96 has a bevel gear 97 fixed upon it, and meshing with gear 97 is a bevel gear 98 fixed on a shaft 100 which thus is driven by the above mechanism whenever main clutch 23ᵃ is engaged. Gear 98 is provided with clutch teeth 98ᵃ, and a clutch member 99 slidably supported on shaft 100 and having clutch teeth 99ᵃ may be shifted to cause engagement of the complimentary clutch teeth and thereby drive member 99, or may be shifted in the opposite direction, to disengage the clutch teeth, in which case member 99 will remain stationary. Shaft 100 extends into similar relationship with unit 13 for the purpose of operating the parts therein similar to those now to be described but in the unit 13 there is no bevel gear 98 nor gear 97 nor shaft 96 etc., the gear 98 and its driving mechanism serving to drive shaft 100 for both units. In unit 13 therefore the bevel gear 98 is replaced by a plain clutch member fixed on shaft 100 and having teeth similar to the teeth 98 for driving a member similar to clutch member 99. The remaining mechanism for the cutting off movement of the unit and all other mechanism is similar in both units.

For shifting clutch member 99 a hand lever 101, see Figs. 2, 4 and 16, is fixed on a shaft 102, provided with an eccentric pin 103, against which the end of a shifter fork 104 is pressed by a spring 105. Fork 104 is fixed on a rod 106 and extends to engage the annular groove 107 in member 99. Lever 101 may be turned to move the eccentric pin 103 to the one direction as shown in Fig. 16 which permits spring 105 to force fork 104 and member 99 to a position causing engagement of the complimentary clutch teeth 98ᵃ and 99ᵃ; or may be turned to an opposite position in which case pin 103 forces fork 104 and the associated parts against the pressure of spring 105 and disengages the clutch teeth.

Figure 5:
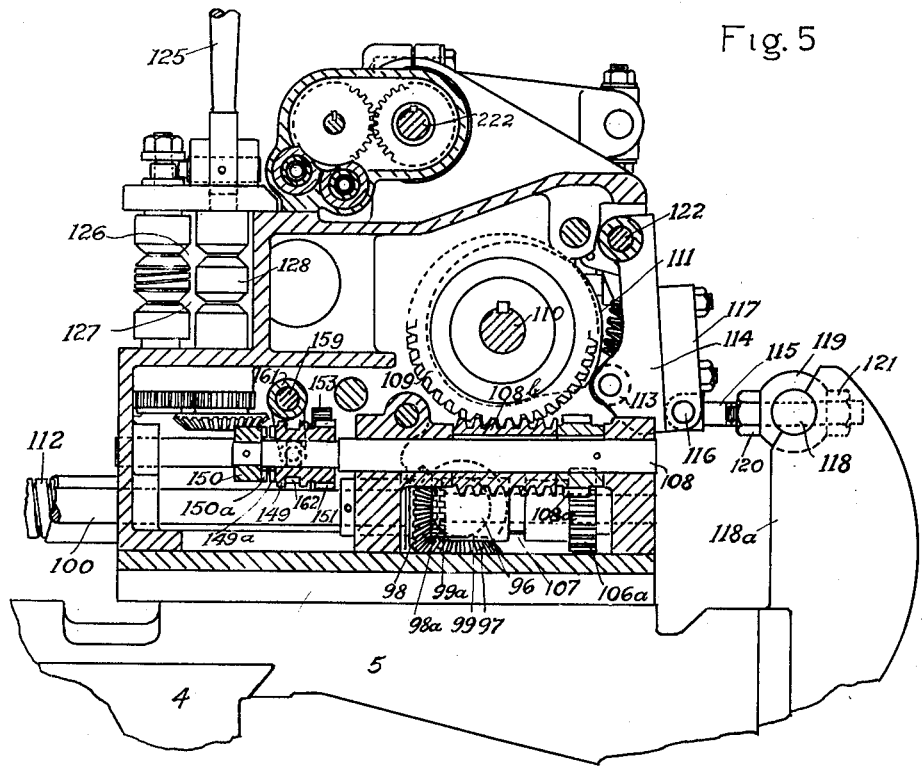
Fig. 5 is a vertical section through the right hand unit, taken along line 5—5 of Fig. 1 and enlarged.

When the clutch teeth are engaged a gear 106ᵃ fixed with member 99 drives a gear 108ᵃ fixed on a shaft 108 upon which is keyed a worm 108ᵇ, see Fig. 5, meshed with a worm wheel 109, see Figs. 5, 11, etc., fixed on a shaft 110 upon which is also fixed a cam 111. The unit 12 is continuously spring pressed to the right and unit 13 is continuously spring pressed to the left by the means of a long helical spring 112 tending to separate the units. The spring is seated in each unit as illustrated for the unit 12 in Fig. 6. As cam 111 revolves it is therefore thrust against a cam roller 113 mounted in a member 114 which is restrained from being thrust to the right by the means of a screw adjustment member 115, see Fig. 5, pivoted at the one end on a pin 116 in a block 117 fixed on member 114 and pivoted on the other end by the means of trunnions 118, fixed in member 118ᵃ which is bolted to the end of saddle 5 and which supports the member 119 through which the screw member 115 passes. Adjustment is provided by the means of the nuts 120 and 121. The member 114 is pivoted on a pin 122. It is apparent that as cam 111 revolves the unit 12 will by the mechanism described, be thrust in the one direction by the cam 111 when a high point in the cam reaches roll 113, and in the other direction by spring 112 as a low point in the cam reaches roll 113 and that while the total linear movement of unit 12 is fixed by the form of cam 111, the position of such movement relative to saw 9 may be changed by the adjustment of the nuts 120 and 121.

A plurality of bushings 123, 124 (see Figs. 4 and 16) are provided with bores 123ª, 124ª, and form stock barholders through which stock bars 123ᵇ, 124ᵇ, are inserted and shoved back to engage with a feed roll mechanism, see Figs. 4, 5 and 17, etc., through apertures 126 and 127. A handle 125 operates to enlarge the apertures 126, 127, when the bars of stock are to be inserted and to decrease the apertures after the stock bars are in place so that the four flat sides of the aperture will frictionally engage the stock bars, as will be described. The member 128, having a plurality of grooves 128ª and 128ᵇ is journaled for rotation but is fixed against axial movement and an extended shank portion 128ᶜ has fixed thereon a bevel gear 129 and a spur gear 130. A shaft 131 axially parallel with member 128 is slidably keyed at its lower end in an axial bore of the upwardly extending shank of a spur gear 132 meshing with gear 130, the shank providing on its outside diameter a bearing member which supports both the shaft 131 and gear 132. At its upper end shaft 131 is slidable and rotatable in a sleeve 133 which is slidably and rotatably supported in a bore 133ª.

A friction member 134 is slidably supported on the downwardly extending shank 133ᵇ of sleeve 133 and a spring 138 thrusts member 134 downwards. A friction member 135 is threaded at 133ᶜ on the shank 133ᵇ whereby it is fixed for axial movement with sleeve 133. A friction member 136 is slidably supported on shaft 131 against a shoulder 131ª whereby axial movement of the shaft in the one direction will axially move member 136, and a spring 139 tends to thrust member 135 and sleeve 133, upon which the member 135 is fixed, upwardly and also tends to thrust member 136 and shaft 131 downwardly, the shaft being thrust downward by virtue of shoulder 131ª. A friction member 137 is slidably supported on shaft 131 and a spring 140 tends to thrust member 137 upward in relation to shaft 131 by virtue of the shoulder or hub against which the spring 140 seats at its lower end. The several friction members and sleeve 133 are all forced to rotate with shaft 131; there being a key 131ᶜ engaging a suitable keyway in members 136 and 137, and an extension 136ª on member 136 engaging a suitable slot in the end of member 135 and likewise engaging a suitable slot in the end of sleeve 133, whereby member 135 and sleeve 133 are each driven from member 136, and there being an extension 135ª on the member 135, engaging a suitable slot in end of the member 134 whereby the member 134 is driven from the member 135.

The combined effect of the several springs is to thrust sleeve 133 and shaft 131 in opposite directions tending to close an annular groove 141 formed between the upper end of sleeve 133 and a washer 142, fixed against of sleeve 133 and a washer 142, fixed against a shoulder on shaft 131 by the means of a nut 143. To limit the movement of washer 142 relative to the end of sleeve 133, a sleeve or collar 144 is set in between them. The annular groove 141 is engaged by a projecting portion 145ª on a short shaft 145 upon which the hand lever 125 is fixed. The portion 145ª is concentric with shaft 145 but is formed of greater radius from the axis at certain points than at others, forming a two lobed cam. When in the position corresponding to the one position of lever 125 the dimensions in the direction of the width of groove 141 is slightly less than the length of collar 144, whereby the projection 145ª engages the groove without friction and retains shaft 131 and sleeve 133 and the various associated members in an axial position such that the openings 126 and 127 are correctly positioned to receive the bars of stock, and such that when bars of suitable size are inserted through the openings 126 and 127 the members 134 and 135 will be spring pressed by the above described mechanism to set up a frictional engagement with the one bar of stock in opening 126 by members 134, 135 and 128; and with the other bar of stock in the opening 127 by members 136, 137 and 128.

For inserting new stock bars or removing short ends of bars it is desired to free the stock bars from such frictional engagement. The previously mentioned enlarged cam portions of projecting portion 145ª are so positioned and formed that as handle 125 is moved to another position than that previously described, one of the cam lobes of portion 145ª thrusts against washer 142 and moves shaft 131 upward, while the other cam lobe thrusts against the end of sleeve 133 and moves the sleeve downward. By virtue of shoulder 131ª, the upward movement of shaft 131 moves member 136 upward. Passing through the member 135 are several thrust pins, one of which is shown at 147, having their opposite ends seated against member 136 and member 134. Upward movement of member 136 is thus communicated to member 134. The member 135 being threaded on sleeve 133, moves downward with the sleeve. Passing through the member 136 are several thrust pins one of which is shown at 148, having their opposite ends seated against member 135 and member 137. Downward movement of member 135 is thus communicated to member 137. The several movements just described are effective to materially enlarge the openings 126 and 127 when lever 125 is moved in the proper direction, and by the construction described the enlarged openings must still be of regular form and substantially in alignment with the stock bar. The various members will then permit free movement of the stock bars through the opening, after which the handle 125 may be suitably moved to restore the frictional engagement necessary for feeding forward the stock.

The roll 128 and also shaft 131 together with members 134, 135, 136 and 137 are given power rotative movement at intervals from shaft 108. When the shaft 108 is rotated as previously described a clutch member 149 slidably supported on shaft 108, see Fig. 5, will be rotated if the member is shifted in a direction to engage the clutch teeth 149$^a$ with the clutch teeth 150$^a$ of a clutch member 150 fixed on shaft 108. When so engaged a gear 151 integral with member 149 drives a gear 152, see Fig. 17, through an idler gear 153 which is suitably supported for rotation and meshes both with the gear 151 and gear 152. Fixed for rotation with gear 152 is a bevel gear 154, both gears 154 and 152 being supported for rotation from the stud 155. Bevel gear 154 meshes with the bevel gear 129 and through previously described gears 130 and 132 drives both friction roll 128 and shaft 131. Thus if clutch teeth 149$^a$ and 150$^a$ are engaged the various friction roll members will be rotated and stock bars frictionally engaged by the rolls in the apertures 126 and 127 will be fed or moved to the rear, the ends of the bars eventually contacting suitable stops 156, see Figs. 11$^a$ and 7, a stop being provided for each bar in alignment with the bore of bushings 123 and 124 and the friction apertures 126 and 127.

The shaft 110, when the lever 101 is in proper position and the clutch teeth 98$^a$ and 99$^a$ are engaged, rotates once for each movement of unit 12 toward and from saw 9. A cam 157 fixed on shaft 110 cooperates with a plunger 158, see Fig. 16 etc., to cause the driving engagement of clutch member 149 at a time when the unit 12 is positioned away from saw 9 whereby the stock bars are fed against the stops by the friction rolls, and after the stock bars are fed back against the stops 156, the cam disengages the clutch member, the mechanism being as follows:

The end 158$^a$ of plunger 158 rests against a lever 160 fixed on a shaft or pivot 159, upon which is also fixed a fork 161, see Figs. 4, 5, and 16 etc. having arms provided with pivoted shoes 161$^a$, 161$^b$ engaging with an annular groove 162 in member 149. A plunger 163 pressed by spring 163$^a$ against an arm 160$^a$ of the lever 160 tends to maintain the clutch in an engaged position when the configuration of cam 157 will permit. The form of cam 157 is such as to disengage clutch member 149 during the period that the unit 12 is in such a position that the stock bars, if fed forward would strike saw 9. During a part of the remaining period of forward and backward movement of unit 12, the cam periphery is cut away sufficiently to permit the clutch to be engaged by spring 163$^a$, the engagement being of sufficient duration to cause both stock bars to be fed back against stops 156, and shortly thereafter the cam again moves plunger 158 to disengage the clutch member 149, following which unit 12 advances toward the saw 9 as previously described.

The mechanism just described forms a stock bar feed mechanism adapted to advance both stock bars simultaneously in the direction of their length at suitable intervals. The stock bars having been fed forward against stops 156, are clamped between the head 164$^a$ of a clamp rod 164, see Figs. 6 and 11, and a clamp plate 165. Suitable bores in head 164$^a$ provide for guiding the head on extended portions of the screws 164$^b$ which hold the plate 165 in place. Rod 164 passes through a suitable bore in a member 166 and is provided with nuts 167, 167$^a$ for adjustment. Member 166 is pivoted on a pin and has an arm 166$^a$ fixed therewith and pivoted at 166$^b$ with a toggle member 168, which is in turn pivoted at 168$^a$, with a lever 169 having a pivot on a pin 169$^a$. Lever 169 carries a member 170 pivoted on pin 170$^a$. Member 170 acts as an equalizer bar for a pair of springs 171 and 172, pulling against the pins 170$^b$ and 170$^c$ in the member 170 and against pins 166$^e$ and 166$^c$ in the member 166. The arrangement is such that the springs tend to thrust the end 166$^a$ of member 166 strongly to the right in Fig. 6 thus causing clamp rod 164 to be moved to the right to cause head 164$^a$ to clamp the stock bars, which have previously been fed forward through apertures 173, 174, between head 164$^a$ and plate 165.

When the stock bars are to be fed forward against stops 156 as previously described it is necessary to relieve them from the clamping pressure of the head 164$^a$ and for this purpose a cam 175 is fixed on shaft 110, having a portion 175$^a$ which thrusts against a roller 176 mounted on one end of pivot pin 168$^a$, the cam form and the arrangement of parts being such as to overcome the clamping pressure of springs 171 and 172 during the entire period of feeding forward of the stock bars, but permitting the springs to clamp the stock bars as previously described, at other times.

It is apparent that the stock bars when fed against stops 156 and clamped as previously described will be cut off during the advance of unit 12 toward saw 9. The portions cut off might be permitted to fall freely and to deposit themselves in suitable receptacles, but in the present machine this is not done for the reason that a subsequent tooling operation is to be performed upon them. When the stock bars are fed forward the portions to be cut off pass into the locating notches 177 and 178 (see Figs. 7 and 11, etc.) of a rear carrier plate 179 and into similar locating notches of a front carrier plate 180, the two plates forming a carrier adapted to receive the stock bar portions and after they are cut off to move them to positions for the subsequent tooling. The stock bar portions after being cut off by saw 9 are retained in notches of the plates, and the plates are then indexed as will be described to position other notches to receive the stock bars as the stock bars are again fed forward and to move the work pieces just previously cut off.

The unit 12 consists of two portions, namely a front portion or unit generally denoted by the numeral $12^a$ see Figs. 4, 11 and $11^a$ and a rear portion or unit generally denoted by the numeral $12^b$. The front portion $12^a$ is fixed for front to rear adjustment with saddle 5 by the means of the slide 14 and the plate 180 is rotatably mounted on portion $12^a$, being supported for rotation by the means of a part 181 fixed on $12^a$ and providing a bore forming an annular bearing for a member 182 fixed with plate 180, the ends of the part 181 providing thrust surfaces against which an enlarged portion $182^a$ of member 182 and the one side of the plate 180 may seat to prevent axial movement of the plate relative to the unit portion $12^a$. A shaft 183 is keyed with plate 180 and prevented from axial movement relative thereto by the means of an enlarged portion $183^a$, and extends rearwardly and is slidably keyed in the axial bore of a sleeve 184 rotatably supported in the unit portion $12^b$, the sleeve 184 being prevented from axial movement relative to $12^b$. The unit $12^b$ is slidably mounted on a rearwardly extending portion 185 of the housing of which slide 14 is a part (see Figs. 4, 7, 9 etc.) the portion 185 being provided with a guide or slide generally denoted by the numeral 186 which is engaged by suitable surfaces on the housing or frame member 187 of unit $12^b$ and by a gib member 188, the gib being movable for clamping unit $12^b$ in various positions along slide 186 by the means of a bolt 189 fixed in gib 188 and having a nut 190 threaded on the shank thereof. As a further means of rigidly clamping the housing 187 when located on slide 186, a T bolt 191 engages a T slot 192 in the slide 186 and is provided with a nut 193 threaded on its shank.

As previously noted, the sleeve 184 is rotatably fixed for axial movement with unit $12^b$, being mounted in the housing 187. The plate 179 is fixed on the enlarged front end of the sleeve 184. The length of the stock bar portion which is to be cut off is determined by the stops 156 which are fixed in housing 187 and movable therewith, and it is apparent from the above description that the length of the cut off portion may be varied at will by adjustment of unit $12^b$ relative to unit $12^a$ and that the length of the index drum formed by the plates 179 and 180 will be at the same time varied to receive the portion so cut off, in the notches 177, 178, etc. of rear plate 179 and the corresponding notches of the front plate 180. Notches have been shown in the respective plates as representative of a variety of possible work holding configurations.

It will be noted that the plates 179 and 180 are constrained to rotate or index as one, by the means of shaft 183 which still permits of their adjustment as described. To rotate or index the plates at suitable intervals, and to locate the plates in the proper positions and to bring first one set and then another of the plate notches or configurations into alignment to receive the stock bars as they are fed forward, the following mechanism is provided. Fixed on sleeve 184 is a member 194 providing a series of radial slots $194^a$, $194^b$, etc. upon its rear end face, see Figs. 9 and $11^a$, the member also providing a series of tapered bores one of which is shown at $195^a$ in Fig. 9. The section portion showing bore $195^a$ being somewhat in front of the section portion showing slots $194^a$ as indicated in Fig. $11^a$, only one of the bores is shown in Fig. 9 but there are additional bores corresponding in number to the several indexing positions of plates 179 and 180.

Figures 9, 10:
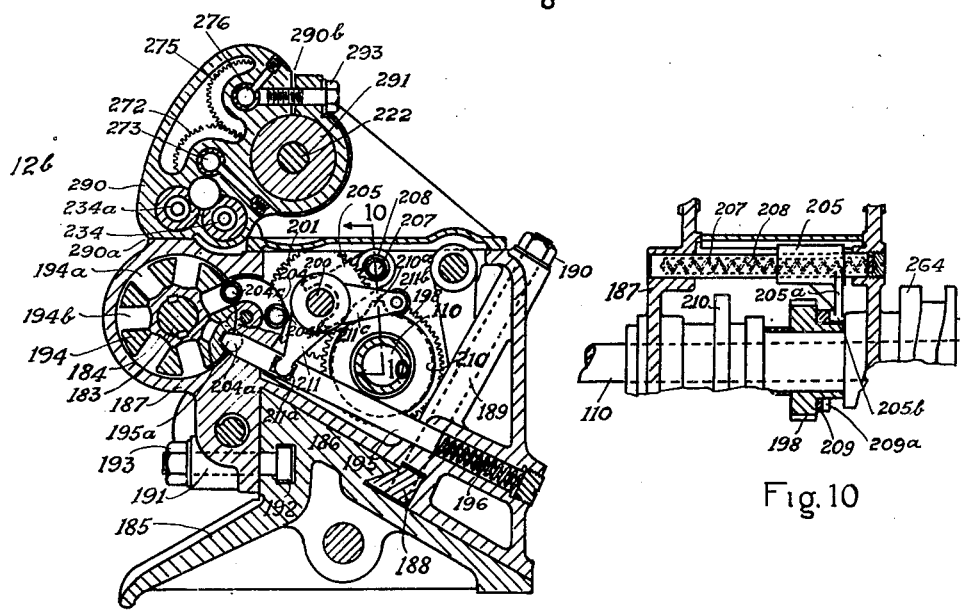
Fig. 9 is a vertical section through the right hand portion of the mechanism taken approximately along line 9—9 of Fig. 1, enlarged.
Fig. 10 is a section along line 10—10 of Fig. 9.

An index plunger 195 is slidably supported in housing 187, and adapted to be thrust strongly by spring 196 and thereby engage with bore $195^a$ or one of the other bores, whenever the member 194 is in a position to bring one of the bores approximately into axial alignment with the index plunger. When the member 194 is to be rotated to index the plates 179 and 180, the plunger 195 is withdrawn from the bore $195^a$ for a sufficient interval to permit the member 194 to move a sufficient amount that the end of the plunger when again released will strike the periphery of the member, where it will then be pressed by spring 196 in readiness to engage with the next bore as the member 194 is rotated. To rotate the member 194 at intervals by an angular amount approximately corresponding to the spacing of the index bores, and at suitable time intervals mechanism is provided as follows:

The shaft 110 is extended rearwardly as shown in Fig. 9 and Fig. $11^a$, and is slidably or adjustably keyed in the bore of a sleeve 197 rotatably supported in unit $12^b$ and adjustable therewith. Fixed on sleeve 197 is a gear 198 engaging with a gear 199 slidable and rotatable on a stud 200. A gear 201 is also rotatable on stud 200 and is fixed against axial movement. The adjacent faces of gears 200 and 201 are provided with complimentary clutch teeth 200ᵃ and 201ᵃ which will engage when gear 200 is moved in the one direction or disengage when the gear is moved in the other direction, whereby the gear 201 will be driven from gear 198, or will stand idle. If driven the gear 201 drives a gear 202 rotatably supported on a stud 203. Fixed with gear 202 is a member 204 provided with spaced rolls 204ᵃ, 204ᵇ, 204ᶜ carried by suitable pivot pins fixed in the member. The rolls are positioned to engage the slots 194ᵃ, 194ᵇ, etc. in the member 194, as the member 204 is rotated, the relationship being such that a rotative movement of 120 degrees applied to the member 204 will move the member 194 an angular amount equal to one seventh of a full revolution, there being seven slots 194ᵃ, etc, and seven index plunger bores in the member 194. The motion thus imparted to the member 194 and hence to the plates 179 and 180, is calculated to relieve the parts of all shock, the relationship and form of the parts being of such nature as to gradually accelerate the member 194 from zero to maximum speed and decelerate again to zero. After 120 degrees of movement of member 204, two of the three rolls 204ᵃ etc. engage two of the slots 194ᵃ etc. and locate member 194 in a position where the next of the bores 195ᵃ is approximately aligned with the index plunger 195 which then enters the bore and accurately positions the member 194 and the plates 179 and 180 connected therewith.

To give the required 120 degrees of motion to member 204 the clutch teeth 201ᵃ and 200ᵃ are engaged by the following means. A fork member 205, See Figs. 9–10–11ᵃ, engages an annular groove or spool 206 fixed with gear 199. Member 205 is fixed on a rod 207 slidably supported in housing 187 and the rod 207 and member 205 are pressed in a direction to engage clutch teeth 200ᵃ and 201ᵃ by a spring 208. An arm 205ᵃ on fork 205 is provided with a contact point 205ᵇ pressed by the spring 208 against the face of a cam 209 fixed for rotation with gear 198 and shaft 110. The face of the cam 209 is cut away at intervals as at 209ᵃ. As cam 209 rotates point 205ᵃ drops into the portions 209ᵃ and the teeth 200ᵃ and 200ᵇ engage. The ratio of the gearing connecting between gear 198 and member 204 and the proportion of the space 209ᵃ cut away on the cam 209 is such that the clutch teeth engage for an interval sufficient to give member 204 the required 120 degrees of movement, after which the clutch teeth are disengaged again by cam 209. This occurs once for each revolution of shaft 110, that is to say once for each cutting off movement of unit 12 toward saw 9 and is so timed by the relative position of cam 209 that soon after the saw has completed cutting off the stock bars and before the stock bars are fed forward, the plates 179 and 180 are moved as above described to bring new notches into position to receive the stock bars.

The index plunger 195 is withdrawn just before the clutch teeth 200ᵃ and 201ᵃ engage, by the means of a cam 210 fixed on sleeve 197, see Figs. 9 and 11ᵃ. A pivoted lever 211 engages a slot 211ᵃ in the index plunger and has an arm 211ᶜ carrying a pivoted roll 211ᵇ which rests against the periphery of the cam 210. The cam portion 210ᵃ is raised, and when the roll 211ᵇ passes over portion the plunger 195 is withdrawn. The relationship is such that the plunger is withdrawn just before the previously described mechanism starts to rotate member 194, and the plunger is released as soon as the bore from which the plunger has just disengaged, has passed the end of the plunger, whereby spring 196 will cause the plunger to engage the next bore as soon as the member 194 has rotated sufficiently.

Figure 6:
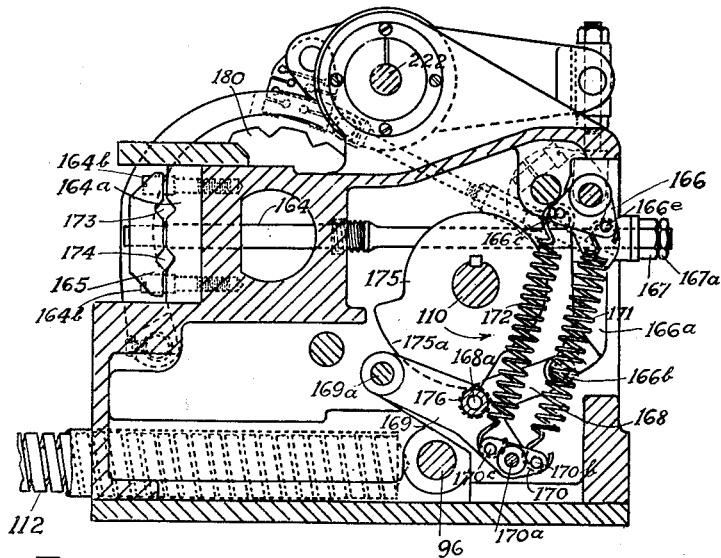
Fig. 6 is a vertical section through the right hand unit along line 6—6 of Fig. 1 enlarged.
Figures 7, 8:
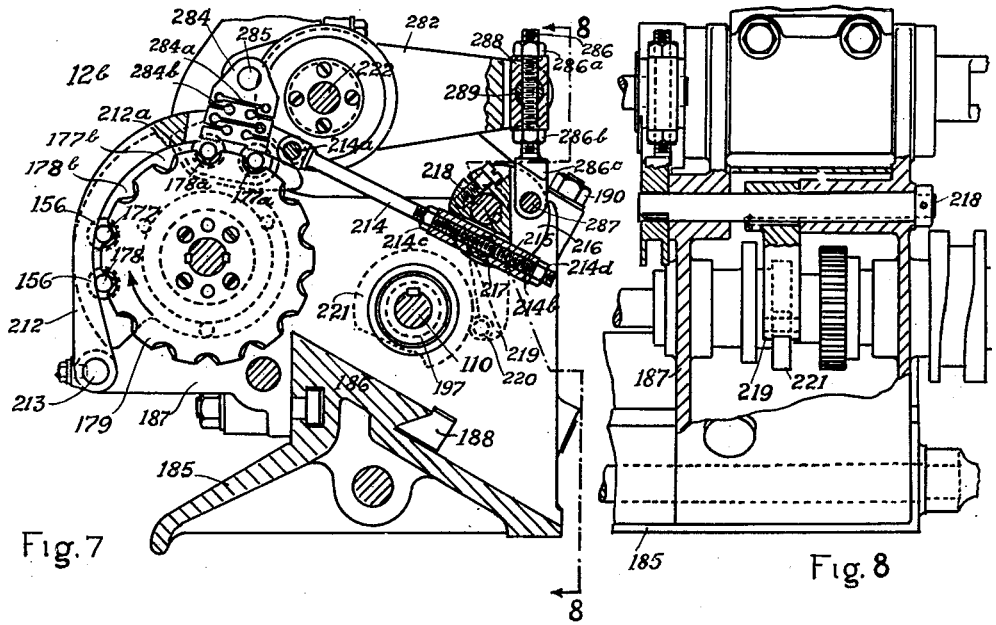
Fig. 7 is a vertical section through the right hand unit along line 7—7 of Fig. 1 enlarged.
Fig. 8 is a view partly in section along line 8—8 of Fig. 7, with certain parts omitted for clearness.

Both plate 179 in the unit 12ᵇ and plate 180 in unit 12ᵃ have means associated therewith for clamping the stock bar with the respective plates during the cutting off period. The means whereby this is accomplished are similar for both units and to avoid repetition will be described only for the unit 12ᵇ as shown in Fig. 7, although the similar means for unit 12ᵃ is shown in Fig. 6 and it will be apparent that the construction and operation are the same for both. A clamping arm or member 212 is pivoted on a pin 213 which is suitably supported and is provided with an extension or arm 212ᵃ carried around a portion of the periphery of plate 179 and having a bolt or rod 214 pivoted in arm 212ᵃ on a pin 214ᵃ. The threaded end 214ᵇ of bolt 214 passes through a suitable bore in a member 215, and is adjustable relative to the member by the means of nuts 214ᶜ and 214ᵈ. Member 215 is pivoted in a part 216 by the means of a pin 217, the part 216 being fixed on a shaft 218 rotatably supported in housing 187.

On shaft 218 is also fixed a cam lever 219 having a pivoted roll 220 engaging the periphery of cam 221 which is fixed on sleeve 197 and therefore rotatable with shaft 110. The form of cam 221 is such that at a suitable point in the revolution of shaft 110 the lever 219 will be moved in a direction to pull bolt 214, by the means of the action of the associated parts, toward the right in Fig. 7 thereby causing clamping arm 212 to contact with and clamp the ends of the stock bars positioned in the notches 177 and 178 of plate 179, and to maintain the parts in such position until the saw has completed cutting off the stock bars, following which the cam will release the parts to permit the plate to be indexed. The form of the arm 212ᵃ and its relation to plate 179 is such that it forms a guide or retainer for the cutoff ends of the stock bars preventing them as the plate is indexed from falling out of the notches in the plate until the plate has revolved past the arm and past the tools which perform certain other operations upon the cut off pieces as will now be described.

The cut off portions of the stock bars have sharp outside corners which it is desirable to remove by burring or chamfering and in the particular instance here illustrated hollow stock bars are to be cut off which thus have shap corners left at the ends of the bore which it is also desirable to remove in a similar manner.

The cut off portions from the stock bars are, at the completion of the cutting off movement, positioned in the notches of the plate 179 and 180, in a position relative to unit 12 as indicated by the position of notches 177, 178 in Fig. 7. The previously described indexing movement of plates 179, 180, will move the plates in a direction indicated by an arrow on Fig. 7 and after being twice indexed, the cut off bar portions will then stand in the position indicated by notches 117ᵃ and 178ᵃ, Fig. 7. When in this position each end of each of the cut off bar portions is chamfered both in the bore and on the periphery by the means of chamfering tools carried by rotatable spindles axially aligned with the bar portions, and which are given an advance and retractive movement as will now be described. A shaft 222 (see Figs. 4, 12, etc.) is continuously driven whenever the main clutch 23ᵃ is driven. The train by which this is accomplished derives motion from the gear 52 there being a gear 223 (see Figs. 1 and 15) meshing with gear 52 and fixed upon a short shaft 224 upon which is also fixed a pulley 225 having a face or belt space 225ᵃ whereby a belt 226 may drive a pulley 227 fixed on a shaft 228 rotatably supported from column 1, and having also fixed thereon a universal joint shaft member 229, which drives a universal joint shaft member 230 fixed on the rear end of shaft 222 by the means of an extensible universal joint shaft of well known construction generally denoted by the numeral 231 in Fig. 1. Another face 225ᵇ on pulley 225 drives, by the means of belt 232, a pulley 233 similarly driving parts similar to member 230 and shaft 228, not shown for reasons previously explained, in the unit 13. There are two chamfering spindles supported with the unit 12ᵇ, generally denoted at 234 and 234ᵃ, Fig. 12, and two chamfering spindles supported with the unit 12ᵃ, generally denoted as 234ᵇ and 234ᶜ, Fig. 12, all of which derive rotative motion from shaft 222 and all having similar construction. Since the construction of each is the same it will be described in detail only for spindle 234 to avoid repetition. A gear 235, Fig. 12ᴬ, is fixed upon or integral with the main spindle member 236 which is slidably supported in the bushing 237 fixed in a housing member 238. A bushing 239 in which the spindle rotates is slidable in a bore in housing 238 which is in axial alignment with the bore of bushing 237. The bushing 239 is prevented from rotating and engages by the means of a suitable slot 240, with the ends of the enlarged head 241 of a rod 242. Bushing 239 is restrained for axial movement with spindle member 236 by the means of washer 243 fitted against the end of gear 235, and a washer 244 positioned by a nut 245 adjustably threaded on member 236. A chamfering tool 246 for chamfering the bore of the stock bar piece has a threaded shank 246ᵃ adjustable in the threaded bore of a chamfering tool 247 for chamfering the outside of the stock bar piece and may be locked in its positions of adjustment by the means of a lock screw 247ᵃ. A bolt or rod 248 has a threaded end 248ᵃ also engaging the threaded bore in chamfering tool 247, and has a shoulder 248ᵇ and a washer 249 which may be pulled back to rest against a washer 250 by the means of a shank 248ᶜ upon which lock nuts 251, 252 are threaded. Washer 250 is strongly thrust against by a spring 253 retained in a suitable bore in member 236 by the means of a plug 254 engaging a threaded portion of the bore of member 236. By the above construction the chamfering tools 246 and 247 will, as member 236 advances, be also advanced, but in the case of undue resistance to the action of the chamfering tools the spring 253 will be overcome and although the spindle member 236 continues to advance no damage is done to the mechanism. It is contemplated that washers 249 of varying thickness may be employed to maintain the distance from the chamfering edge of the chamfering tools 246 and 247 to the rear of washer 249 in spite of cutter wear whereby the cutters 246 and 247 together with rod 248 may form a unit, which is interchangeable and replaceable by similar units without adjustment of the machine. A projecting drive key portion 236ᵃ on spindle member 236 engages a suitable slot in the extended end of cutter 247 whereby both the cutters are positively driven. A member 255 is removably fixed on the bushing 237 by the means of a suitable bore engaging the end of the bushing projecting from housing 238, and when in position thereon the end 255ᵃ forms a spacer face, the opposed faces of the front and rear members respectively fixed with unit 12ᵃ and unit 12ᵇ forming a passageway or space through which the cut off stock bar pieces must pass, whereby they are positioned correctly for the chamfering cutters. The chamfering cutters 247 must be larger than the diameter of the stock bar pieces and as the cutters are retracted might pull the stock bar piece with them into the bore of the member 255 through which the cutters are advanced, in which case plates 179 and 180 would be prevented from indexing and damage or breakage might result. To prevent this a part or member 256 is rotatably supported in the bore of bushing 237 and is retained against axial movement by an enlargement 256$^a$ positioned between the end of bushing 237 and a suitable shoulder in the piece 255. Member 256 has a portion 256$^b$ standing in the tooth space of cutter 247, and thus providing a thrust piece preventing the movement of the work piece with the cutter as the cutter moves back. The part 256 must rotate with cutter 247 and for this purpose the member is provided with a suitable slot engaging with the projecting key portion 236$^a$ of the spindle member 236, the slots in the member 256 and in the cutter 247 being positioned to bring the member portion 256$^b$ into the tooth space of the cutters.

The enlarged head 241 of rod 242 engages both with the bushing 239 and in a similar manner with a similar bushing on the spindle 234$^a$ and is advanced and retracted to simultaneously advance and retreat both spindles at suitable intervals, by the means of a lever 257 pivoted on a pin 258 supported from housing 187. At the one end the lever 257 carries a fork member 259 engaging an annular groove in a spool 260 adjustable on the threaded end 242$^a$ of the rod 242 and locked in its various positions of adjustment by the means of nuts 261 and 262. At the other end the lever 257 carries a roll 263 pivoted on pin 263$^a$ engaging with a cam groove 264$^a$ in a cam 264 fixed on sleeve 197 and hence rotatable with shaft 110. The form and position of the groove 264$^a$ and the relationship of the various parts is such that at suitable intervals the spindles 234 and 234$^a$ are advanced and retracted whereby the chamfering cutters carried by the respective spindles chamfer the bore and the exterior of the rear end of the stock bar pieces held in the notches of plates 179 and 180 when in the position indicated by the figures 177$^a$ and 178$^a$ Fig. 7; and are then withdrawn to permit indexing of the plates.

Similarly the spindles 234$^b$ and 234$^c$ are advanced and retracted in unison with spindles 234 and 234$^a$, by the means of rod 264 having an enlarged portion 265 engaging with the bushings of the respective spindles, spool 266, pivoted fork 267 and pivoted lever 268 having pivoted roll 269 engaging cam groove 270$^a$ in the cam 270 which is fixed upon the front end of shaft 110 in the unit 12$^a$.

The spindle 234$^a$ is provided with a gear 271 similar to the gear 235 of the spindle 234 and the gears 235 and 271 each mesh with a gear 272. The gear 272 is rotatably supported on a short shaft 273 and is driven from a gear 274 fixed on shaft 222 through an idler 275 rotatably supported on a short shaft 276, whereby both spindles 234 and 234$^a$ are driven in the same direction whenever shaft 222 is driven.

The spindles 234$^b$ and 234$^c$ are respectively provided with gears 277 and 278 similar to the gear 235 of the spindle 234 and each meshing with a gear 279 rotatably supported on a short shaft 280 and driven from a gear 281 fixed on shaft 222 whereby spindles 234$^b$ and 234$^c$ are driven in the same direction whenever shaft 222 is driven. The spindles 234$^b$ and 234$^c$ are driven in a direction opposite to the spindles 234 and 234$^a$ since the drive to the spindles 234$^b$ and 234$^c$ lacks an idler corresponding to gear 275. By this means the chamfering tools are interchangeable between the spindles although facing the work from opposite ends.

It will be noted that the spindles 234 and 234$^a$ being supported with unit 12$^b$ and moved with the stops or gauges 156 whenever the gauges are adjusted to vary the length of stock to be cut off, therefore require no individual adjustment for this purpose. The two spindles 234 and 234$^a$ are adjustable as a unit by the means of adjustable spool 260 for varying the depth or amount of the chamfer at the rear end of the work pieces, and the spindles 234$^b$ and 234$^c$ are likewise adjustable as a unit by the means of the adjustable spool 266 for varying the amount of the chamfer at the front end of the work pieces.

The work pieces being chamfered require clamping and clamps are provided for this purpose as will now be described. Precisely similar clamps are provided for the front and rear end of the stock bars respectively associated with the plate 179 in the rear unit 12$^b$ as shown in Figs. 7 and 11$^a$ etc. and with the plate 180 in the front unit 12$^a$ as shown in Figs. 6 and 11. The clamps being precisely similar in each unit only the one associated with the unit 12$^b$ will be described in detail to avoid repetition. The member 216 is given movement as previously described by the means of the lever 219 and the cam 221 for clamping the ends of the stock bar pieces which are to be cut off, and since the chamfering is done at exactly the same period of time in which cutting off takes place, the movement of member 216 is utilized for also clamping the work pieces during chamfering. A clamp lever 282 is pivoted on an annular bearing 283 suitably supported from unit 12$^b$ and at the one end carries a spring clamp member 284 pivoted on pin 285 and formed (see Fig. 7) with slots 284ª, 284ᵇ, etc. to provide a certain amount of resiliency, the pivoting of the member providing an equalizing of the clamping pressure between the stock bar ends in the two notches 177ª and 177ᵇ of plate 179. At the other end the lever 282 is connected for movement from member 216 by the means of a threaded bolt having an enlarged head 286ᶜ pivoted in member 216 by the means of a pin 287, the bolt being adjustably mounted in a member 288 pivoted in the lever 282 by the means of a pin 289. Adjustment of bolt 286 relative to lever 282 is obtained by the means of nuts 286ª, 286ᵇ threaded on the bolt, whereby the amount of clamping pressure may be regulated. The arrangement of the various parts is such that during the entire chamfering action, the clamp will react on the work pieces, but upon completion of the chamfering and before plate 179 is indexed, the clamp will release to permit indexing.

The two rear chamfering spindles 234 and 234ª together with their drive gearing are arranged in a housing member 290 pivoted about the bushings 291 and 292 which form supports and bearings for shaft 222 (see Figs. 9 and 12) a locating stop being provided by contact of housing 290 with housing 187 at 290ª and a clamp for housing 290 being provided by slotting the housing at 290ᵇ to permit bolts 293 to contract a portion of the housing upon the bushings. By the means of this construction the spindles may be swung about an axis corresponding to the axis of shaft 222 to raise them up to a convenient position for replacement of the chamfering cutters, the fork 267 being open on one side for this purpose. A similar arrangement is incorporated for spindles 234ᵇ and 234ᶜ.

It is desirable that the drive to cam shaft 110 shall stop when either of the stock bars being operated upon, has been completely cut up into lengths by the previously described mechanism. This is desirable in order that the mechanism shall not be subjected to unnecessary wear, and also as an indication to the operator that new stock bars are required. Means are therefore provided both for the unit 12 and for the unit 13 whereby the cam shafts of the respective units will stop when either of the stock bars operated upon by the respective units is finished, the mechanism being individual to the respective units so that, although for instance unit 12 may stop because one of its stock bars has been cut up, the unit 13 will continue to operate until one of the stock bars being cut by unit 13 is finished.

The mechanism whereby this is accomplished will now be described for the unit 12. Positioned to be contacted by the stock bars as they are inserted through bushings 123 and 124 are the contact blocks or members 294 and 295, see Figs. 4, 11, 16, respectively fixed on shafts 294ª, 295ª. Also fixed on the respective shafts are members 296 and 297 respectively provided with the springs 296ª, 297ª, tending to pull the one end of blocks 294 and 295 down into the space occupied by the stock bars.

A member 298 pivoted with lever 296 is provided with a smaller shank portion 298ª and an enlarged end 298ᵇ. A similar member 299 pivoted with lever 297 is provided with a small shank portion 299ª and an enlarged end 299ᵇ. A plunger 300 is pressed by a spring 301 against a cam 302 fixed for rotation with shaft 110 (see Fig. 11) the form of the cam being such that once per revolution of shaft 110, the plunger is forced by a projection or raise 302ª on cam 302 to the left in Fig. 16. When the stock bars are in position and the blocks 294 and 295 are thereby raised to the position shown in Fig. 16, the parts 298 and 299 stand in a position such that the small portion 298ª and 299ª of each is aligned with the end 300ª of the plunger 300, but after feeding either stock bar forward until it is used up, the one or the other of blocks 294 or 295 will drop under the influence of the respective springs and will move the one or the other of the enlarged portions 298ᵇ or 299ᵇ into alignment with the end of the plunger. A lever 303 is freely pivoted on previously described rod 159 and has its one arm extended into alignment with plunger 300. When the small portions of 298ª, 299ª, are in alignment with the plunger, the plunger movement is not sufficient to move lever 303, but when either of the blocks in the absence of a stock bar moves into the space normally occupied by the stock bar, the enlarged portions 298ᵇ and 299ᵇ fill the space between the plunger 300 and the arm of lever 303 and the lever will then be moved by the described movement of the plunger, and by the means of the lever arm 303ª will move the rod 106 to the right in Fig. 16. As has been previously described, the rod 106 controls the engagement of the driving clutch member 99 for the shaft 110, and when shifted as described will disengage the driving clutch whereupon all movement of the unit 12 will cease except that the chamfering spindles will continue to rotate. Nor can the shaft 110 be started in motion again until the inserting of a new stock bar lifts the block whose movement has caused the tripping or stopping of the shaft 110 whereupon the enlarged portion 298ᵇ or 299ᵇ which is preventing clutch re-engagement will again be displaced to the position shown in Fig. 16 and spring 105 may then force rod 106 to the left again to cause re-engagement of the driving clutch. Ordinarily after the mechanism has tripped the lever 101 will be positioned by the operator to maintain the clutch disengagement while new stock is being positioned, in which case after the stock bar is in place and the lever 101 again shifted to a position corresponding to clutch engagement the shaft 110 will immediately start.

After the cut off stock bars portions have been chamfered as above explained the continued indexing movements of plates 179 and 180 carries them around to a position where they may freely fall out of the plate notches and they may be guided into any suitable receptacle. The angular relationship of the slide 186 upon which the parts fall by gravity is of material assistance in guiding the finished parts away from the operating mechanism.

A pump of well known construction is provided as shown at 304, Fig. 1, being driven from a rearward extension of shaft 21 by the means of a chain 305 connecting between the sprockets 306—307 respectively mounted upon the shaft 21 and upon the shaft 308 of the pump. A suction pipe 309 communicates with a reservoir 310 in the base of column 1 and a delivery pipe 311 leads from the pump to an upper level and communicates with a number of distributing pipes 312, 312$^a$, etc. by means of which cooling fluid is delivered over the saw 9 and over the various chamfering tools. Fluid so delivered is collected in a pan arrangement on saddle 5, as indicated at 313, Fig. 4, the pan arrangement being carried back to a portion 314, Fig. 1, providing a low level, from which a pipe 315, projecting downward into an opening 316 in a cover 317 of the reservoir 310, may return the fluid to the reservoir to be used again and again.

The low level portion 314 is, in a sense, individual to the unit 12, although some of the fluid delivered for the unit 13 may be returned as above described. An additional low portion 314$^a$ is provided on the left of the machine (see Fig. 2) with which the pan arrangement 313 also communicates, and which delivers fluid by the means of a pipe 315$^a$ to a reservoir 310$^a$ similar to the reservoir 310, from which fluid may return to the reservoir 310 by the means of a channel 317.

One of the forms of work material upon which this preferred embodiment of the invention as shown in the drawings, is intended to operate is a helix, in which the material is wound or twisted closely into a form virtually equivalent to a round bar having an axial bore as illustrated in Fig. 18 but it is also contemplated that ordinary pipe or tubing having an axial bore may also be operated upon by this or equivalent mechanism with equally great advantage, in which case it might not be necessary to provide all of the various clamping devices illustrated as desirable for the helically formed stock bars because of the comparative flexibility of helically wound stock. It is also contemplated that ordinary bar stock having no bore may be operated upon by this or equivalent mechanism in which case the chamfering cutters corresponding to cutter 246 in the various chamfering spindles for chamfering the ends of the bore, would be removed.

It is also to be noted that the chamfering operation is merely illustrative of a variety of operations which may be performed upon one or both ends of the cut off stock bar pieces since it is apparent that the spindles 234, 234$^a$, 234$^b$, 234$^c$ may be provided with different tools than those chosen to illustrate the invention and are merely illustrative of a variety of other forms of tool supports which might be used with suitable tools for tooling operations upon the work pieces.

It is also apparent that while the present drawings show end operations performed on the stock bars only at one point or position of the stock bar pieces as they are indexed in the plates 179, 180, it is possible and is contemplated that operations might be performed at other positions. For instance, the stock bar pieces might be operated upon when in the position corresponding to notches 177$^b$, 178$^b$, Fig. 7 and also at 177$^a$ and 178$^a$ as illustrated whereby a plurality of operations might be performed successively on the stock bar ends without adding to the time required to complete the finished piece.

Many equivalent modifications of the particular embodiment illustrated will be apparent each of which are within the scope and spirit of the invention as particularly pointed out in the following claims.

I claim:

1. In a metal working machine the combination of a cut-off tool, a relatively movable stock bar holder, stock bar feed mechanism associated with said tool and holder, a main transmission for said machine, and a power train for the actuating of said bar feeding mechanism and stock bar holder; together with automatic means adapted to interrupt said train without interrupting said transmission when the stock bar held by said holder has been substantially completely cut into work piece lengths by said tool.

2. In a metal working machine the combination of a cut-off tool and stock bar holding and intermittently operable feeding means whereby work pieces may be cut off one after another from a relatively long stock bar, a power actuated clamp operable on said bar between intervals of operation of said feeding means, a carrier adapted to receive a portion of said bar to be cut off by said tool and to move said bar portion after it is cut off to a predetermined position for subsequent tooling operations, and a power actuated clamp operative at intervals. upon said bar portion when in said predetermined position.

3. In a metal working machine the combination of a cut-off tool, a stock bar holder, bar feed mechanism associated with said holder and adapted to feed a stock bar in the direction of its length at intervals, a carrier adapted to receive a work piece cut off by said tool and to move it to a predetermined position, a movable tool support guided for movement to perform a subsequent tooling operation upon said work piece when in said predetermined position, a plurality of clamps one of which is adapted to act upon said stock bar at intervals and another of which is adapted to act upon said work piece when in said predetermined position, a power train for the actuating of said feed mechanism, said carrier, said tool support and each of said clamps, and a power trip device operative to interrupt the driving relationship of said train when the rearward end of a stock bar in the course of its advance by said feed mechanism passes a certain element of said trip device.

4. In a metal working machine, the combination of a cut-off tool and unitary mechanism associated therewith whereby work pieces may be cut off one after another from a plurality of relatively long stock bars, said mechanism being bodily movable relative to said tool in a plurality of transverse paths, and means for movement of said mechanism in each of said paths.

5. In a metal working machine the combination of a cut-off tool and unitary mechanism associated therewith whereby work pieces may be cut off one after another from relatively long stock bars, said mechanism being movable to an operative position and to another position permitting free access to said tool, a power train for the movement of said mechanism from one to the other of said positions and power trip mechanism operative to interrupt said train when said mechanism has been moved to said other position.

6. In a mechanism for cutting off work pieces one after another from a relatively long stock bar and having a main transmission, the combination of feed means for advancing said stock bar at intervals in the direction of its length, a cut-off tool, cut-off feed means for advancing said stock bar relative to said tool in a direction transverse to the first named advance movement, a power train connected to said main transmission and to said feed means to effect said advance movements, and a trip adapted to interrupt the driving relationship of said power train without interrupting said main transmission when the rearward end of a stock bar in the course of its advance in the direction of its length has passed a certain element of said trip.

7. In a mechanism for cutting off work pieces one after another from a relatively long stock bar, the combination of bar feed mechanism adapted to advance a stock bar at intervals in the direction of its length, a power train therefor, a power trip device adapted to interrupt said train when the rearward end of the advancing bar passes a certain point and a hand operated device movable to interrupt said train irrespective of the position of said stock bar.

8. In a metal working machine the combination of means for cutting off work pieces one after another from a relatively long stock bar, together with means for subsequently tooling said work pieces one after another including a carrier adapted to receive said work pieces and to move them to a predetermined positioned; said carrier being formed of portions relatively adjustable to correspond to a variety of lengths of work pieces, and a tool support movable with one of said portions whereby a given adjustment of the last named portion effects a corresponding change in the position of said support.

9. In a metal working machine the combination of a movable work carrier adapted to receive a work piece in one position thereof and to move it to a predetermined position for a tooling operation, said carrier having portions relatively adjustable to correspond with a variety of lengths of work pieces; and a plurality of tool supports respectively supported with respective to said portions whereby a given adjustment of one of said portions relative to the other portion effects a corresponding adjustment of the one support relative to the other support.

10. In a machine for cutting off and subsequently tooling work pieces one after another from a relatively long stock bar, the combination of a cut-off tool, a stock bar holder reciprocable for the cutting off of said work pieces, a carrier adapted to receive said work pieces as they are cut off and reciprocable as a unit with said holder, and power indexing means operable upon said carrier and providing therefor a step by step movement at intervals whereby the work pieces received by said carrier are moved to a predetermined position in which said tooling operation is to be performed.

11. In a machine for cutting off and subsequently tooling work pieces one after another from a relatively long stock bar, the combination of a cut-off tool, a stock bar holder reciprocable for the cutting off of said work pieces, an intermittently power operative stock bar feed device associated with said holder whereby said stock bar may be advanced in the direction of its length at intervals, a carrier adapted to receive a portion of said stock bar as it is fed forward by said feed device and to retain said portion when it is cut off, said feed device and carrier being reciprocable as a unit with said holder, and power indexing mechanism operative upon said carrier at intervals between the operation of said feed device.

12. In a machine for cutting off work pieces one after another from a relatively long stock bar and having a main transmission, the combination of a cut-off tool, a stock bar holding device relatively reciprocable therewith, intermittently operative feed means for advancing a stock bar in the direction of its length including a power train driven from said main transmission, and interrupting means for said power train including a member moved to occupy a certain position when a stock bar is inserted in said holding device and moved to another position when the rearward end of the advancing stock bar has passed said member, and a clutch element in said power train and controlled from said member.

13. In a cut-off machine having a main transmission the combination of an intermittently operative power device for advancing a stock bar in the direction of its length, a power train driven from said main transmission and including a clutch member movable to interrupt said train, power operable means for the movement of said clutch member, and means in part controlled by the position of the stock bar for controlling said power operable means, to interrupt said train without interrupting said main transmission.

14. In a machine for the cutting off and subsequent tooling of work pieces one after another from a relatively long stock bar, the combination of a cut-off tool, a stock bar holder reciprocable relative to said tool for the cutting off of said work pieces, bar feed mechanism operative at intervals to advance said stock bar in the direction of its length, a work carrier having a plurality of positions of rotation in each of which the carrier is adapted to receive a portion of said stock bar when it is advanced by said feed mechanism and to retain said portion when it is cut off by said tool, indexing mechanism operative on said carrier at intervals between the intervals of operation of said feed mechanism and adapted to move the carrier from one to the other of its positions together with the cut off work piece whereby the cut off work piece is moved to a predetermined position and the carrier is relocated to receive a different portion of the stock bar, and means for tooling said work piece when in said predetermined position including a power actuated tool support.

15. A machine as specified in claim 14 including a common power train for the relative movement of said tool and holder and for actuating said feed mechanism said indexing mechanism and said tool support; a power trip operative for the interruption of said train, and control means for said power trip including a member adapted to be contacted and thereby moved to a certain position when a stock bar is inserted in said holder, and to move to another position when the rearward end of the advancing stock bar has passed said member.

16. In a machine for cutting off and chamfering work pieces one after another from hollow stock bars formed of helically wound stock the combination of a cut-off saw, a stock bar holder reciprocable relative to said saw for cutting off of said work pieces, feed mechanism operable to advance said stock bar at intervals in the direction of its length, a carrier adapted to receive said work pieces and having a step by step power movement operable between the intervals of operation of said feed mechanism whereby the cut off work pieces are advanced one after another to a predetermined position, a plurality of power operated chamfering spindles respectively operative upon opposite ends of the work pieces when in said predetermined position, and a plurality of power operated clamps, respectively operable upon said stock bar between the intervals of operation of said feed mechanism and upon said work piece when in said predetermined position.

17. In a metal working machine, the combination of cut-off means and bar feed means each power operated at alternate intervals and each simultaneously operative upon a plurality of stock bars whereby work pieces will be cut off one after another from both of said bars simultaneously, a carrier adapted to receive the work pieces cut off from both bars, power operated index means operative upon said carrier between the intervals of operation of said stock feed device for simultaneously advancing said work pieces to predetermined positions, and a plurality of substantially similar tools respectively simultaneously operable upon the different work pieces when in said positions, whereby a plurality of substantially duplicate work pieces are produced at each cycle of machine operation.

18. A machine as specified in claim 17, in which the cut-off means, the bar feed means and the index means are provided with a common driving train, together with power trip mechanism operative to interrupt said train including control members respectively movable into the path of the respective stock bars as they are advanced by said feed means and each effective independently to cause the operation of said trip device.

19. In a machine for cutting off work pieces one after another from a plurality of stock bars, the combination of stock bar feeding mechanism adapted to advance said bars simultaneously in the direction of their length, a power train operative at intervals upon said mechanism, and a power trip including a part movable to a given position when the one stock bar has passed said part, a second part movable to a given position when the other stock bar has passed said second part and motion transmitting connections operative to interrupt said train when either of said parts moves to said given position.

20. In a machine for cutting off work pieces one after another from a plurality of stock bars and including feeding and cut off means simultaneously operable on both said stock bars, the combination of means for subsequently tooling said work pieces including a carrier configurated to simultaneously receive a plurality of work pieces produced by said feeding and cut off means, index means associated with said carrier for the simultaneous movement of said work pieces to predetermined positions, and a plurality of substantially similar tool sets respectively operative on the respective work pieces when in said positions, said carrier having other configurations adapted to receive another plurality of work pieces when the carrier is positioned for the first mentioned work pieces to be tooled.

21. In a metal working machine, the combination of a cut-off tool, a relatively movable holder having a plurality of stock bar guides spaced apart, a carrier providing a plurality of sets of stock bar receiving configurations, the configuration of each set being spaced in accordance with the spacing of the stock bar guides on said holder, indexing mechanism operative on said carrier at intervals whereby a first set of configurations is moved from alignment with said guides to a predetermined position and a second set of configurations is brought into alignment with the guides, and a plurality of tooling devices respectively operative upon work pieces held in the respective configurations of said set when in said predetermined position.

22. In a metal working machine the combination of a cut-off tool, a stock bar holder providing guides for a plurality of stock bars and relatively movable for causing said tool to simultaneously cut off a work piece from each stock bar, a plurality of stops, and power actuated bar feed mechanism adapted to simultaneously advance said stock bars in the direction of their length against said stops.

23. In a metal working machine the combination of a cut-off tool, a stock bar holder providing guides for a plurality of stock bars and relatively movable for causing said tool to simultaneously cut off a work piece from each stock bar, power actuated bar feed mechanism adapted to advance each of said stock bars at intervals, and power actuated clamp means having a portion operative upon each of said bars and operative between the intervals of operation of said feed mechanism.

24. In a metal working machine the combination of a cut-off tool, a stock bar holding device providing guides for a plurality of stock bars and relatively movable for causing said toop to simultaneously cut off a work piece from each of said bars, and a plurality of power actuated clamps for each of said stock bars respectively operative on opposite sides of the plane in which said tool is operative.

25. In a metal working machine the combination of a cut-off tool, a stock bar holder providing guides for a plurality of stock bars and relatively movable for causing said tool to simultaneously cut off a work piece from each stock bar, power operated bar feed mechanism operative upon both of said stock bars at intervals, a carrier adapted to receive said work pieces and power operated at intervals betweens the intervals of operation of said feed mechanism to simultaneously move each of said work pieces to predetermined positions, and power operated clamp means including clamps operative upon the stock bars in said holder and clamps operative upon each of said work pieces when in said predetermined position.

26. In a metal working machine the combination of a cut-off tool, a stock bar holder providing guides for a plurality of stock bars and relatively movable for causing said tool to cut off a work piece from each of said bars, a work carrier adapted to receive said work pieces and power operated at intervals to move each work piece to a predetermined position, and a plurality of power operated tool supports respectively guided for movement for tooling the respective work pieces when in said predetermined position.

27. In a metal working machine the combination of a cut-off tool and a stock bar holding and feeding device adapted to advance a stock bar axially in the direction of its length at intervals and to cut off work pieces one after another therefrom; a plurality of tool supports each power operable to advance for tooling said work pieces respectively at opposite ends thereof; the zone of operation of said tool supports being spaced away from the position occupied by said work pieces when being cut off from said stock bar; and a carrier having a step by step motion and adapted to transfer the work pieces one after another from the last named position to a predetermined position where said tool supports will be operative thereon.

28. In a machine for alternately cutting off work pieces from a plurality of stock bars, the combination of a cut-off tool, a first and second unit each providing a stock bar holder and a power operated bar feed mechanism for advancing the stock bar at intervals in the direction of its length and power means for rendering said cut-off tool alternately operative upon the stock bar in the different units.

29. In a metal working machine the combination of a cut-off tool, a first and second unit each including a stock bar holder and a stock bar feeding device operative at intervals, a power train operative to alternately advance the one or the other of said units relative to said tool, whereby work pieces may be alternately cut off one after another from stock bars held in the respective holders, and a plurality of carriers respectively associated with the respective units for receiving the cut off work pieces, said carriers each being power movable for movement of the work pieces to pre-determined tooling positions.

30. In a metal working machine the combination of a cut-off tool, a plurality of stock bar holders, power trains operable on the respective holders to advance the holders relative to said tool, and a plurality of power trips respectively operable to interrupt the respective power trains.

31. In a metal working machine the combination of a cut-off tool and a plurality of units each including a stock bar holder, bar feed means associated with said holder and adapted to feed a stock bar at intervals in the direction of its length, a carrier adapted to receive a work piece cut off from said bar and to move it to a predetermined position, a tool support guided for movement to perform a tooling operation upon said work piece when in said predetermined position, and a plurality of clamps one of which is adapted to act upon said stock bar at intervals and another of which is adapted to act upon said work piece when in said predetermined position; together with a power train for the alternate relative operative movement of the one and the other of said units and said tool; whereby work pieces may be alternately cut off and subsequently tooled from stock bars held in the respective units.

32. In a metal working machine the combination of a cut-off tool and a relatively movable stock bar holder adapted to hold a plurality of stock bars, feed mechanism associated therewith and adapted to simultaneously advance said stock bars in the direction of their length at intervals, a carrier adapted to receive work pieces cut off from said stock bars by the previously mentioned mechanism and to simultaneously move both said work pieces to predetermined positions, a plurality of tool supports respectively guided for movement to perform a tooling operation upon the respective work pieces when in said predetermined positions, clamp means operative upon each of said stock bars at intervals and clamp means operative upon each of said work pieces when in said predetermined position.

33. In a machine of the nature disclosed, the combination of a cut-off tool and a plurality of units each adapted to hold a plurality of stock bars and for simultaneous power movement of said stock bars at intervals in the direction of their length, and power means for alternately rendering said tool operative upon the stock bars in the different units.

34. In a metal working machine the combination of a cut-off tool and a plurality of units alternately cooperative therewith; each of said units including a stock bar holder adapted to hold a plurality of stock bars, power feed mechanism associated therewith and adapted to simultaneously advance said stock bars at intervals in the direction of their length, a carrier adapted to receive both the work pieces cut off from the stock bars by the previously mentioned mechanism and to simultaneously move both said work pieces to predetermined positions, a plurality of tool supports respectively guided for movement to perform a tooling operation upon the respective work pieces when in said predetermined positions, clamp means operative upon each of said stock bars at intervals and clamp means operative upon each of said work pieces when in said predetermined position.

35. In a metal working machine the combination of a cut off tool, stock bar holding and advancing mechanism movable relative to said tool to advance a stock bar and cut off a work piece therefrom at intervals, a carrier adapted to receive and move said work piece to a predetermined tooling position, said carrier having a portion relatively adjustable to adapt said carrier to receive a variety of lengths of work pieces, and a plurality of work clamps respectively associated with the different relatively movable portions of the carrier.

36. In a metal working machine as specified in claim 35 the combination of a stop adapted to limit the advance of said stock bar and adjustable with said adjustable portion of said carrier, whereby the length of work piece to be cut off will be determined in accordance with the adjustment of said carrier to receive the work piece.

37. In a metal working machine the combination of a cut off tool, stock bar holding and advancing mechanism movable relative thereto to advance and cut off a work piece from each of a plurality of stock bars at intervals, and a plurality of stops respectively adapted to limit the advance of the respective stock bars; said holding and advancing mechanism including different contact portions individual to the respective stock bars, and means for yieldably forcing said different portions to contact the respective stock bars with substantially equal pressure, whereby to force each of said stock bars with substantially equal pressure against the respective stops during the advance movement of said bars.

38. In a metal working machine the combination of a cut off tool, stock bar holding and advancing mechanism movable relative thereto to advance and cut off a work piece from each of a plurality of stock bars at intervals, and a carrier having configurations spaced apart respectively to receive the respective work pieces; said holding and advancing mechanism including a friction device having different stock bar positioning contact portions respectively positioned in accordance with the spacing of the different configurations, and a plurality of other contact portions each movable to respectively contact with different stock bars positioned by the first named portions.

39. A metal working machine as specified in claim 38 in which said other contact portions are provided with yieldable pressure means to force said other portions against the different stock bars with substantially equal pressure.

40. In a metal working machine the combination of a cut off tool, stock bar holding and advancing mechanism movable relative thereto to advance and cut off a work piece from each of a plurality of stock bars at intervals, and a carrier having configurations spaced apart respectively to receive the respective work pieces; said holding and advancing mechanism having for each stock bar a set of relatively movable contact portions, the respective sets being positioned to contact different stock bars when the portions are relatively moved and to thereby align the respective stock bars with the respective configurations, means yieldably forcing the contact portions of each set into contact with a suitably positioned stock bar, and means adapted to simultaneously release said portions from contact with each of said stock bars.

41. In a metal working machine, the combination of a cut off tool, a plurality of stock bar holding units respectively movable relative to said tool for cutting off work pieces from different stock bars, a plurality of mechanisms respectively associated with the respective units to advance the stock bar to be cut off by the unit in the direction of its length at intervals, a main power train, branch line transmissions connected with said train and respectively operative on the respective units, a plurality of power trips respectively for the interruption of the different branch lines, and a plurality of control means respectively for the different power trips and operable in accordance with the advance of the respective stock bars.

In witness whereof I hereto affix my signature.

JOSEPH B. ARMITAGE.